United States Patent [19]
Akiyama et al.

[11] Patent Number: 6,144,745
[45] Date of Patent: Nov. 7, 2000

[54] METHOD OF AND APPARATUS FOR RETAINING AND VERIFYING OF DATA ON RECORDING MEDIUM

[75] Inventors: Ryota Akiyama; Seiichi Urita; Gengo Tazaki, all of Kawasaki, Japan

[73] Assignee: Fujitsu Limited, Kawasaki, Japan

[21] Appl. No.: 09/017,059

[22] Filed: Jan. 27, 1998

[30] Foreign Application Priority Data

| Apr. 7, 1997 | [JP] | Japan | 9-088486 |
| Apr. 7, 1997 | [JP] | Japan | 9-088487 |
| Apr. 10, 1997 | [JP] | Japan | 9-092630 |

[51] Int. Cl.$^7$ ............................................ G06F 12/16
[52] U.S. Cl. ............................................ 380/232
[58] Field of Search ............................ 369/13; 380/227, 380/228, 229, 230, 201, 231, 232; 405/57, 51

[56] References Cited

U.S. PATENT DOCUMENTS

| 5,646,993 | 7/1997 | Aizawa | 380/4 |
| 5,657,299 | 8/1997 | Nakajima et al. | 369/13 |
| 5,857,021 | 1/1999 | Kataoka et al. | 380/4 |
| 5,881,038 | 3/1999 | Oshima et al. | 369/59 |

FOREIGN PATENT DOCUMENTS

| 1-101042 | 1/1989 | Japan . |
| 2-287772 | 11/1990 | Japan . |
| 4-207538 | 7/1992 | Japan . |

*Primary Examiner*—Tod R. Swann
*Assistant Examiner*—Matthew Smithers
*Attorney, Agent, or Firm*—Staas & Halsey LLP

[57] ABSTRACT

For warranting a validity of data recorded on a medium such as a rewritable magneto-optic disk etc, when registering a plurality of documents (n, n+1 . . . ) on the same recording medium, an n-th authenticator obtained by executing an encrypting process of data of the n-th document is recorded together with the n-th document data, and, when registering data of the (n+1)th document, an (n+1)-th authenticator is generated by executing the encrypting process of the n-th authenticator and the (n+1)-th document data as the (n+1)th authenticator.

17 Claims, 26 Drawing Sheets

FIG. 3
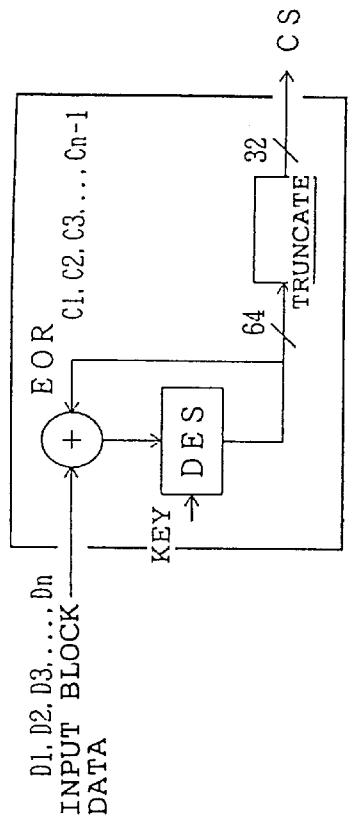
(a)
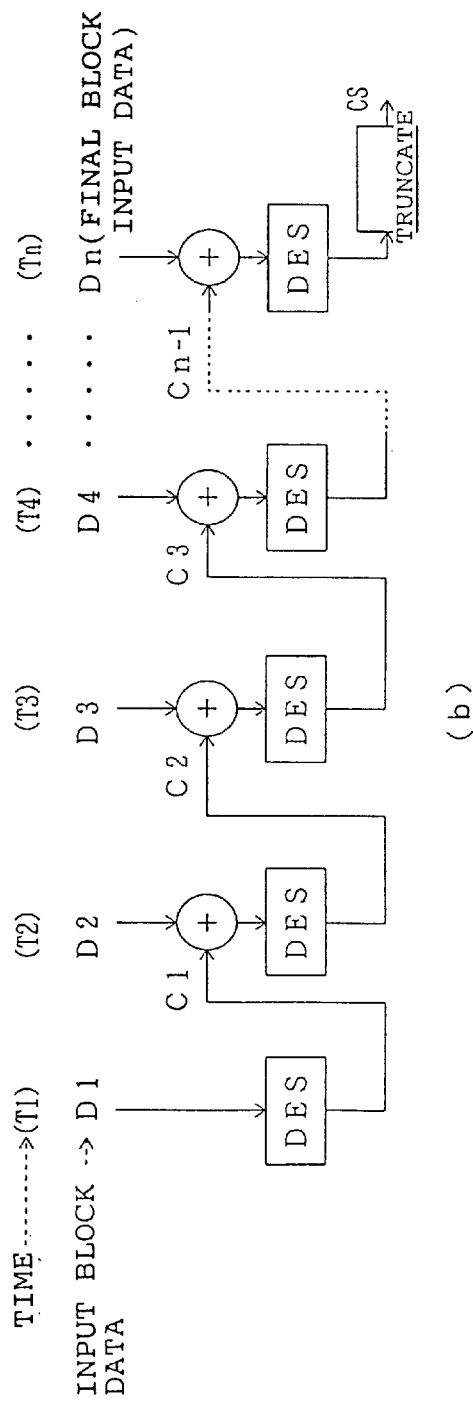
(b)

FIG. 10
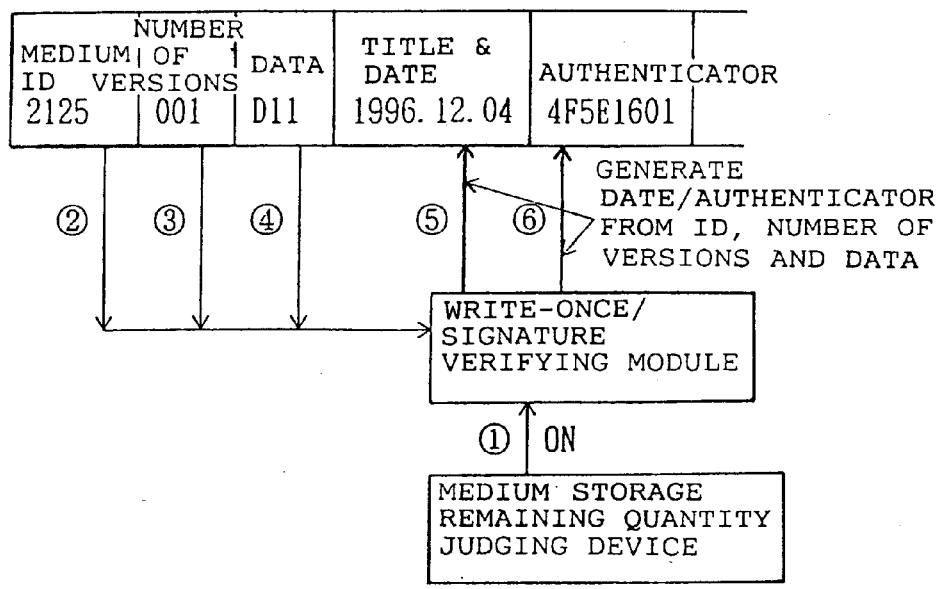
(a)
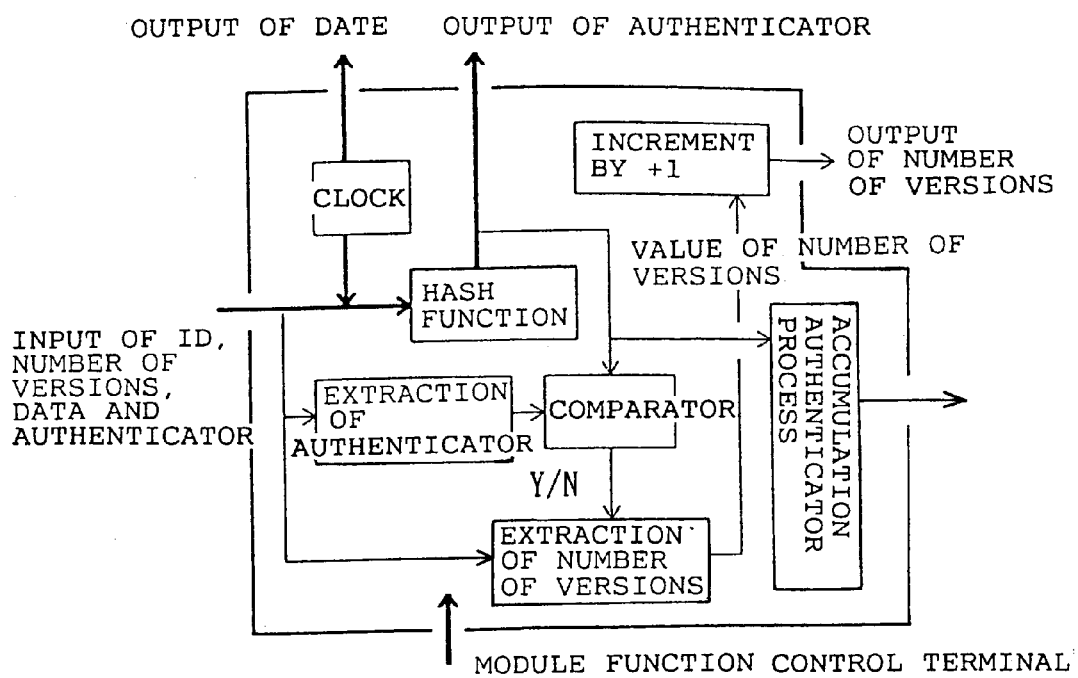
(b)

FIG. 11
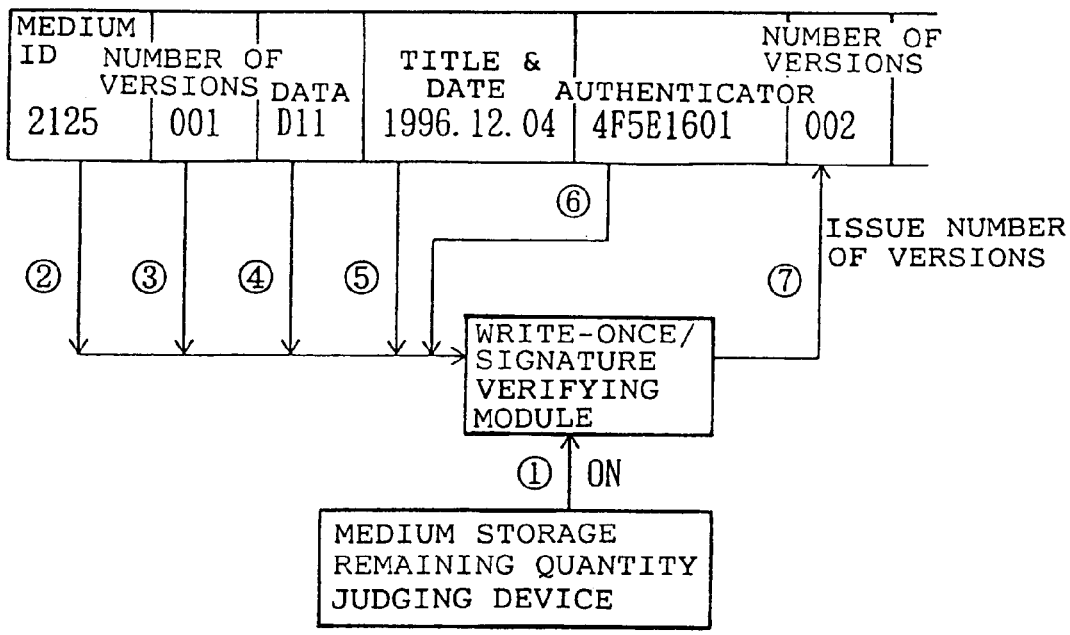
(a)
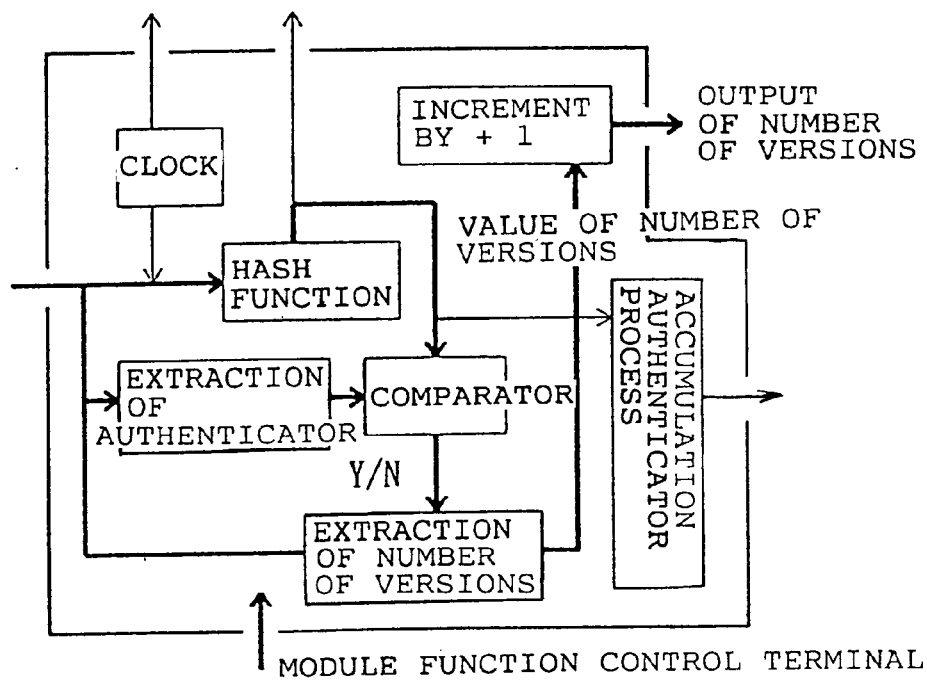
(b)

FIG. 12
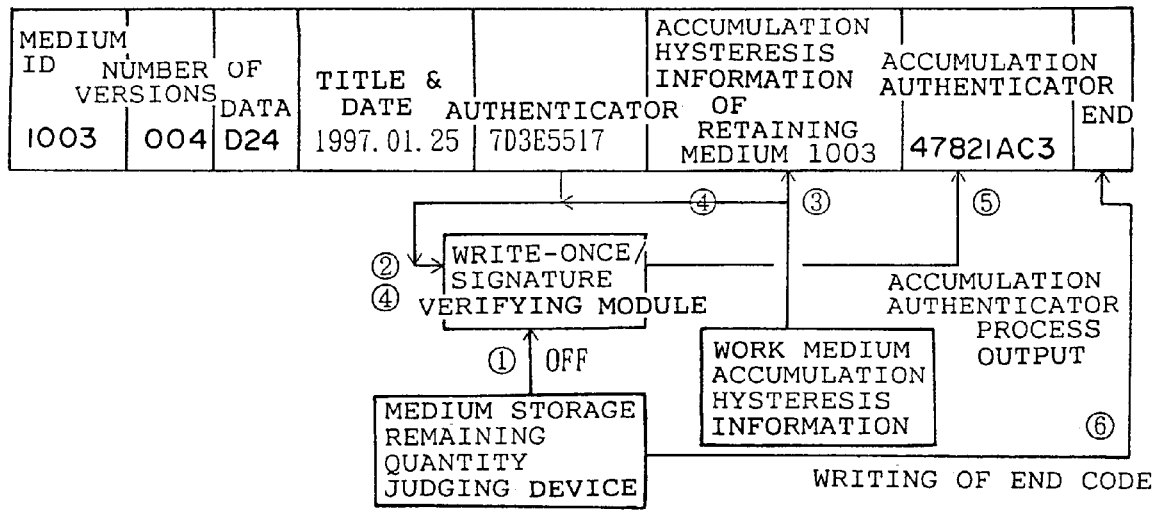
(a)
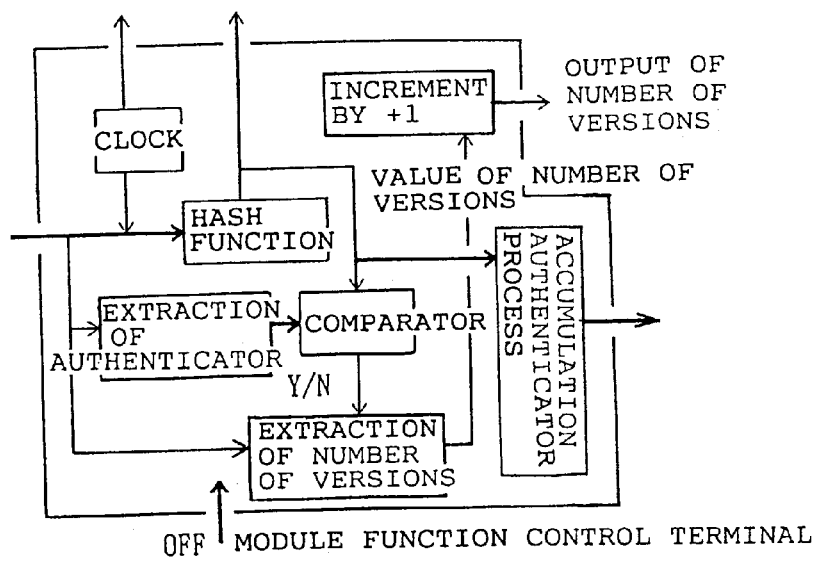
(b)

FIG. 13

[EXAMPLE OF FORMAT ON FIRST VERSION MEDIUM 2125]

| MEDIUM ID | NUMBER OF VERSIONS | DATA | TITLE & DATE | AUTHENTICATOR | NUMBER OF VERSIONS | DATA | TITLE & DATE | AUTHEN-TICATOR | HYSTERESIS | ACCUMULATION AUTHENTICATOR | |
|---|---|---|---|---|---|---|---|---|---|---|---|
| 2125 | 001 | D11 | 1996.12.04 | 4F5E1601 | 002 | D12 | 1996.12.10 | 869B24FF | | 96811DF0 | END |

| SERIAL NUMBER | MEDIUM ID | TITLE & CREATION DATE | CREATOR | NUMBER OF VERSIONS | AUTHEN-TICATOR | TITLE & CREATION DATE | CREATOR | NUMBER OF VERSIONS | AUTHENTICATOR |
|---|---|---|---|---|---|---|---|---|---|
| 001 | 2125 | 1996.12.04 | Mr. A | 001 | 4F5E1601 | 1996.12.10 | Mr. A | 002 | 869B24FF |

←——————— HYSTERESIS INFORMATION ———————→
OF MEDIUM ID2125

(a)

[EXAMPLE OF FORMAT ON SECOND VERSION MEDIUM 1003]

| MEDIUM ID | NUMBER OF VERSIONS | DATA | TITLE & DATE | AUTHENTICATOR | NUMBER OF VERSIONS | DATA | TITLE & DATE | AUTHEN TICATOR | HYSTERESIS | ACCUMULATION AUTHENTICATOR | |
|---|---|---|---|---|---|---|---|---|---|---|---|
| 1003 | 001 | D21 | 1997.01.11 | 772DA699 | 004 | D24 | 1997.01.25 | 7D3E5517 | | 47821AC3 | END |

| HYSTERESIS INFORMATION OF ID2125 | SERIAL NUMBER | MEDIUM ID | TITLE & CREATION DATE | CREATOR | NUMBER OF VERSIONS | AUTHEN-TICATOR | TITLE & CREATION DATE | AUTHENTICATOR |
|---|---|---|---|---|---|---|---|---|
| | 002 | 1003 | 1997.01.11 | Mr. A | 001 | 772DA699 | 1997.01.25 | 7D3E5517 |

←——————— HYSTERESIS INFORMATION ———————→
OF MEDIUM ID1003

(b)

[EXAMPLE OF FORMAT ON THIRD VERSION MEDIUM 2108]

| MEDIUM ID | NUMBER OF VERSIONS | DATA | TITLE & DATE | AUTHENTICATOR | BLANK (DATA UNCREATED) | HYSTERESIS | ACCUMULATION AUTHENTICATOR |
|---|---|---|---|---|---|---|---|
| 2108 | 001 | D31 | 1997.02.01 | 38AE6109 | | | 38AE6109 |

| HYSTERESIS INFORMATION OF ID1003 | SERIAL NUMBER | MEDIUM ID | TITLE & CREATION DATE | CREATOR | NUMBER OF VERSIONS | AUTHENTICATOR |
|---|---|---|---|---|---|---|
| | 003 | 2108 | 1997.02.01 | Mr. A | 001 | 38AE6109 |

←——————— HYSTERESIS INFORMATION ———————→
OF MEDIUM ID2108

(c)

FIG. 15
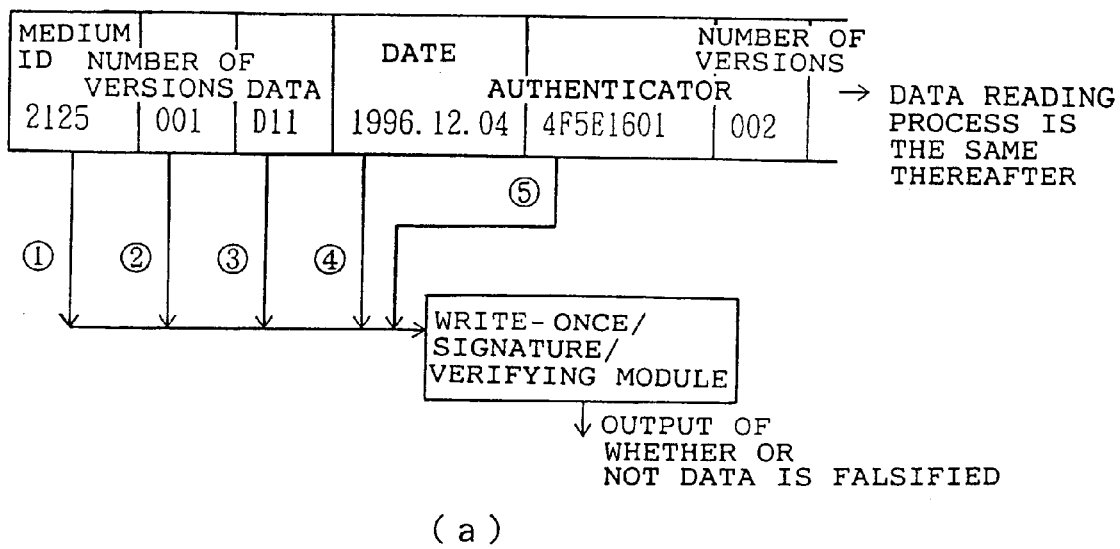
(a)
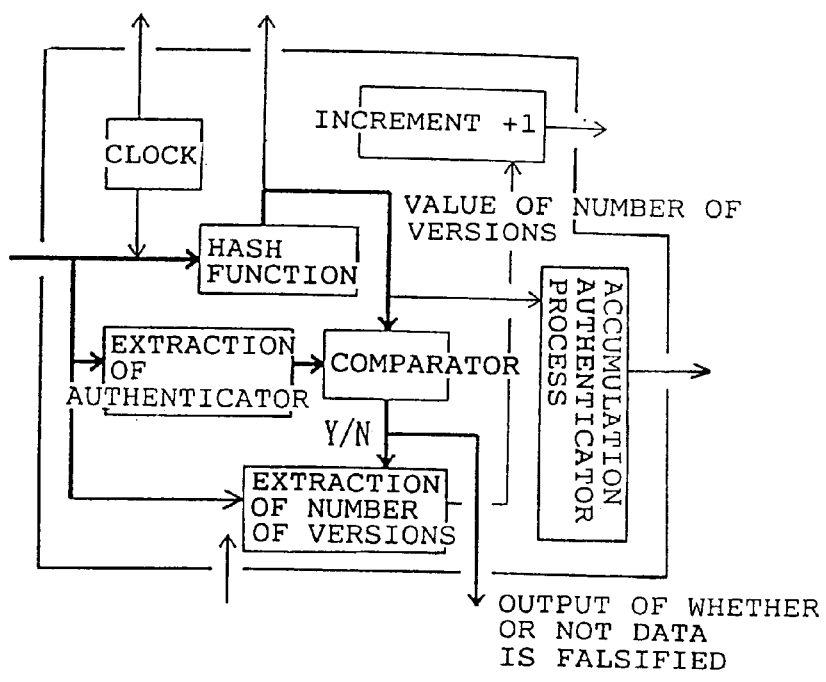
(b)

FIG. 21
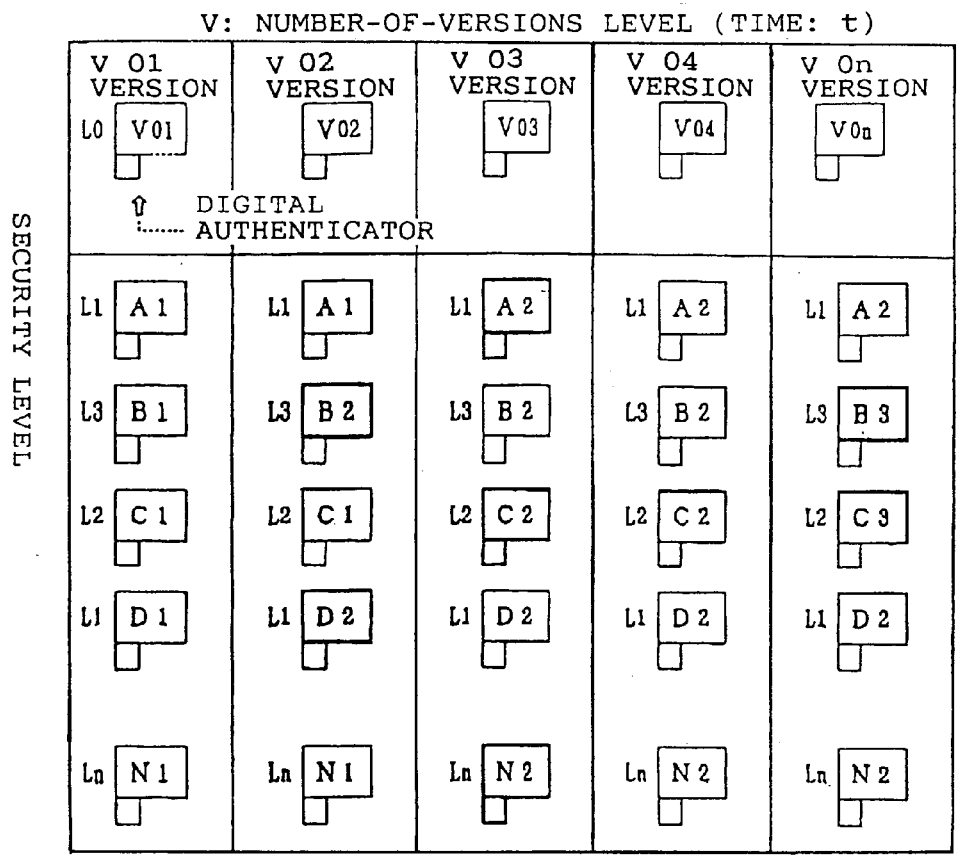
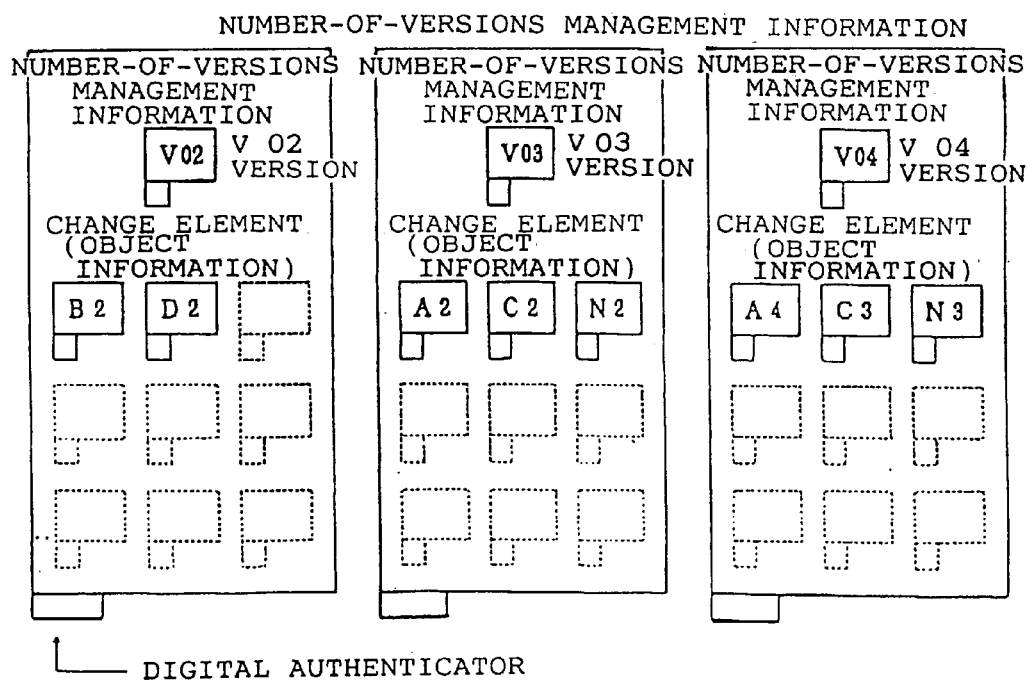

METHOD OF AND APPARATUS FOR RETAINING AND VERIFYING OF DATA ON RECORDING MEDIUM

BACKGROUND OF THE INVENTION

The present invention relates to a system for retaining data on a data rewritable or write-once large capacity recording medium such as a magneto-optic disk (MO) and an optical disk or a magnetic disk etc.

Large capacity recording mediums, having several hundred mega bytes have been highlighted with paperless information in hospitals and government offices.

Among those mediums, large capacity magneto-optic disk and write-once CD-R (Compact-Disk Recordable) have gained a bright prospect because of their high propagation to the public and easy availability.

The MO is, however, easy to erase and add the data, and hence an illegal act such as rearranging, replacing or deleting the data recorded on the MO (which are termed "falsification"), or falsifying the date data on a document file can easily be conducted.

On the other hand, with respect to the CD-R capable of only the write-once operation, it happens that only the medium recorded with inconvenient data is disposed of, and it is impossible to prevent such an act that the data on the CD-R are, after temporarily reading to a computer, falsified, and the falsified data are written to other CD-R.

For preventing the respective illegal acts described above, there has been contrived a system of warranting a validity of the data, which involves executing a signatory process of the data recorded on the medium by use of a hash function, encrypting the statically processed data with a public key supplied from an authentication center, recording the encrypted result as a check sum (CS) in an area different from the data area on the same medium, and decrypting the check sum (CS) by use of a secret key corresponding to the public key.

This system is, however, although the falsification of the data on the same medium can be prevented to some extent, incapable of preventing the falsification of the date data, the disposal of the inconvenient medium, and the write of the falsified data to other medium and is not therefore suited to recording the data of official documents etc obliged to preserve for fixed years as official records and requiring the warrant of the validity thereof.

It is a primary object of the present invention, which was contrived in view of such problems, to provide a data retaining/managing system capable of warranting a validity of data recorded on a medium.

SUMMARY OF THE INVENTION

To accomplish the above object, according to one aspect of the present invention, when registering a plurality of documents (n, n+1 . . . ) on the same recording medium, an n-th authenticator obtained by executing an encrypting process of data of the n-th document is recorded together with the n-th document data, and, when registering data of the (n+1)th document, an (n+1)-th authenticator is generated by executing the encrypting process of the n-th authenticator and the (n+1)-th document data as the (n+1)th authenticator, and then recorded.

The authenticator obtained from the concerned document data is registered per document data, and an authenticator of the next document data is obtained from the previous document data and the authenticator thereof. It is thereby possible to warrant a continuity of the documents and easily detect illegal acts such as a falsification of an intermediate document and a disposal of the intermediate document, and to therefore restrict the illegal acts against the documents.

BRIEF DESCRIPTION OF THE DRAWINGS

Other objects and advantages of the present invention will become apparent during the following discussion in conjunction with the accompanying drawings, in which:

FIG. 3 is an explanatory diagram showing digital signature creating procedures used in the data retaining apparatus in the embodiment;

FIG. 10 is an explanatory diagram showing a write-once operation of the data retaining apparatus in the embodiment;

FIG. 11 is an explanatory diagram showing the write-once operation of the data retaining apparatus in the embodiment;

FIG. 12 is an explanatory diagram showing the write-once operation of the data retaining apparatus in the embodiment;

FIG. 13 is an explanatory diagram showing an accumulation authenticator storing operation by the data retaining apparatus in the embodiment;

FIG. 15 is an explanatory diagram showing procedures of verifying the data subjected to the write-once process;

FIG. 21 is a diagram showing one applied example of the three-dimensional authenticating function incorporated into the data retaining apparatus in the embodiment;

DESCRIPTION OF THE PREFERRED EMBODIMENT

A data retaining apparatus in accordance with an embodiment is an apparatus for retaining data on a magneto-optic disk (hereinafter abbreviated to MO), and incorporates functions including a general medium processing function and a retention-purposed medium processing function (a write-once function). Herein, to start with, an outline of a data retaining method based on the data retaining apparatus in the embodiment regarding general medium processing, will be explained.

Figure 1:
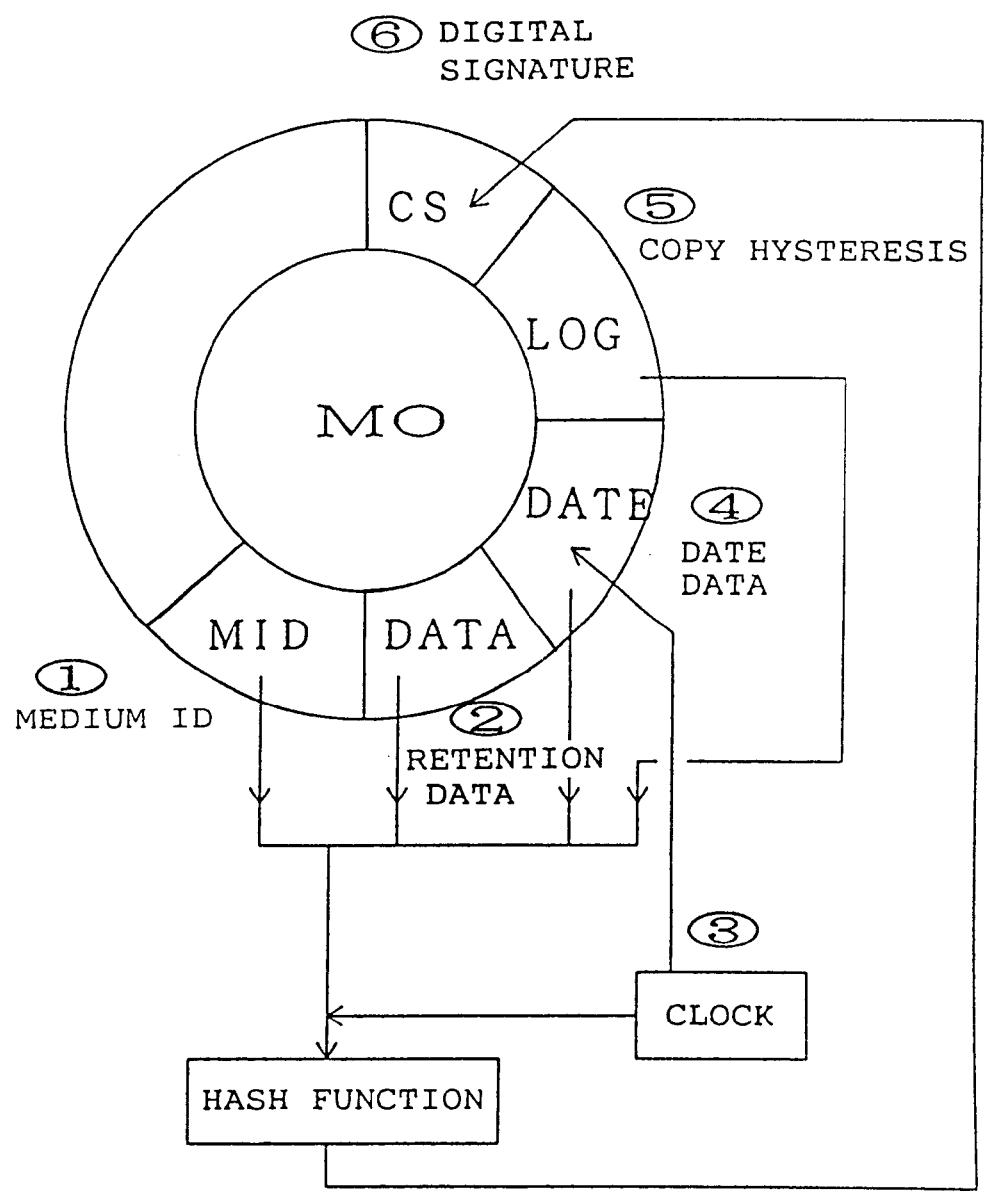
FIG. 1 is an explanatory diagram showing an outline of data retaining procedures by a data retaining apparatus in an embodiment.

As schematically illustrated in FIG. 1, when in the general medium processing, the present data retaining apparatus retains, on the disk MO, data "DATA" in such a way that "DATA" are made corresponding to a piece of hysteresis information "LOG" and date data "DATE" which are defined as outputs of a tamper-free clock provided within the data retaining apparatus on the occasion of retaining "DATA" on the disk MO. Further, the data retaining apparatus obtains a hash function output when inputting a medium ID "MID" previously given to the disk MO, the data "DATA", the date data "DATE" and the hysteresis information "LOG". The data retaining apparatus then retains, on the disk MO, this hash function output as a digital signature "CS" concerning the data "DATA". Note that a certain item of data is transmitted and copied based on the information unit consisting of the medium ID, the data, the date, the hysteresis data and the digital signature.

Figure 2:
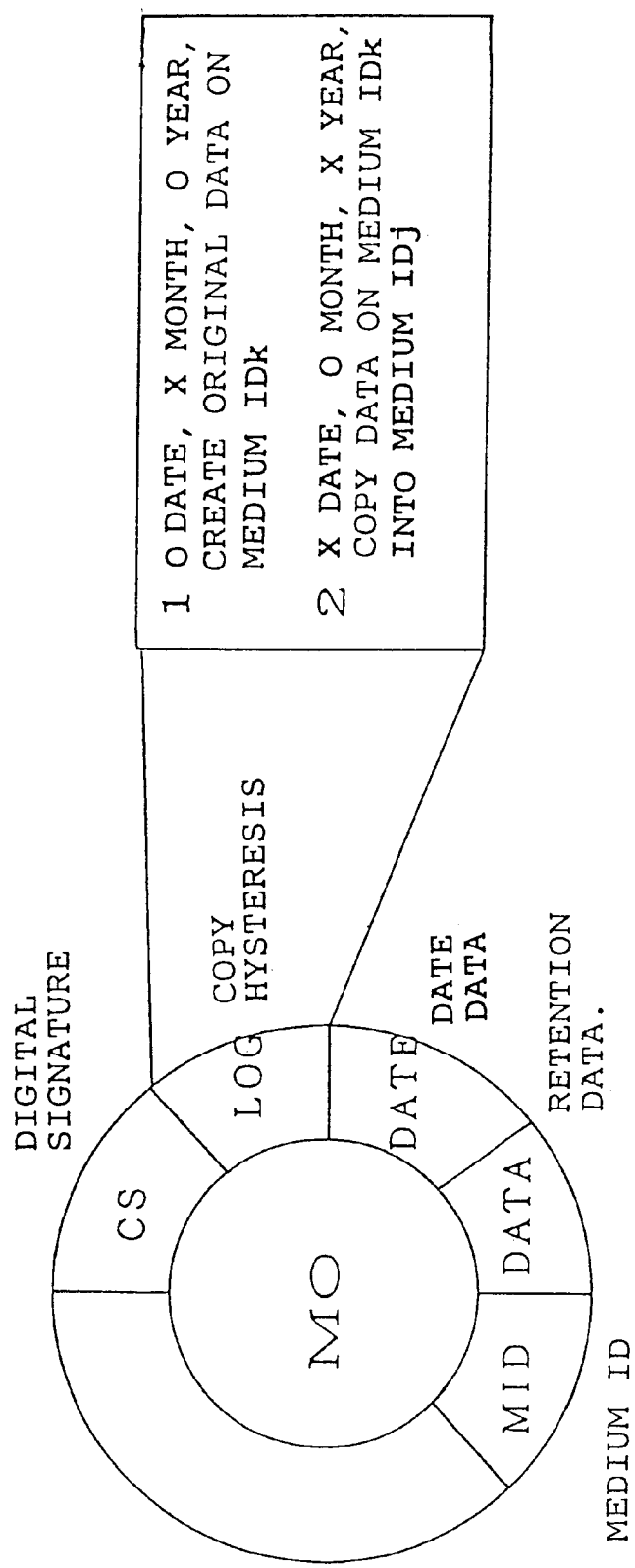
FIG. 2 is an explanatory diagram of hysteresis information to be retained on an MO by the data retaining apparatus in the embodiment.

Further, pieces of information representing a data creation hysteresis and a data copy hysteresis as schematically shown in FIG. 2 are stored as the hysteresis information "LOG". Moreover, The digital signature "CS" is obtained by use of a mechanism having a construction based on ISO8731-1 shown in FIG. 3(a). Specifically, if the data that should acquire the digital signature are data (D1–Dn) for n-blocks, as shown in FIG. 3(b), to begin with, the first block data D1 is encrypted by a DES, thereby obtaining data C1. Subsequently, the data C1 and EOR of next block data D2 are again encrypted by the DES, thereby obtaining data C2. Thereafter, the same process is repeatedly executed with respect to data Ci-1 and block data Ci (i=3 to n). Then, high-order 32 bits of an encrypted result (64 bits) relative to the data Cn-1 and the block data Cn, are fetched by truncating and serve as the digital signature "CS".

Figure 4:
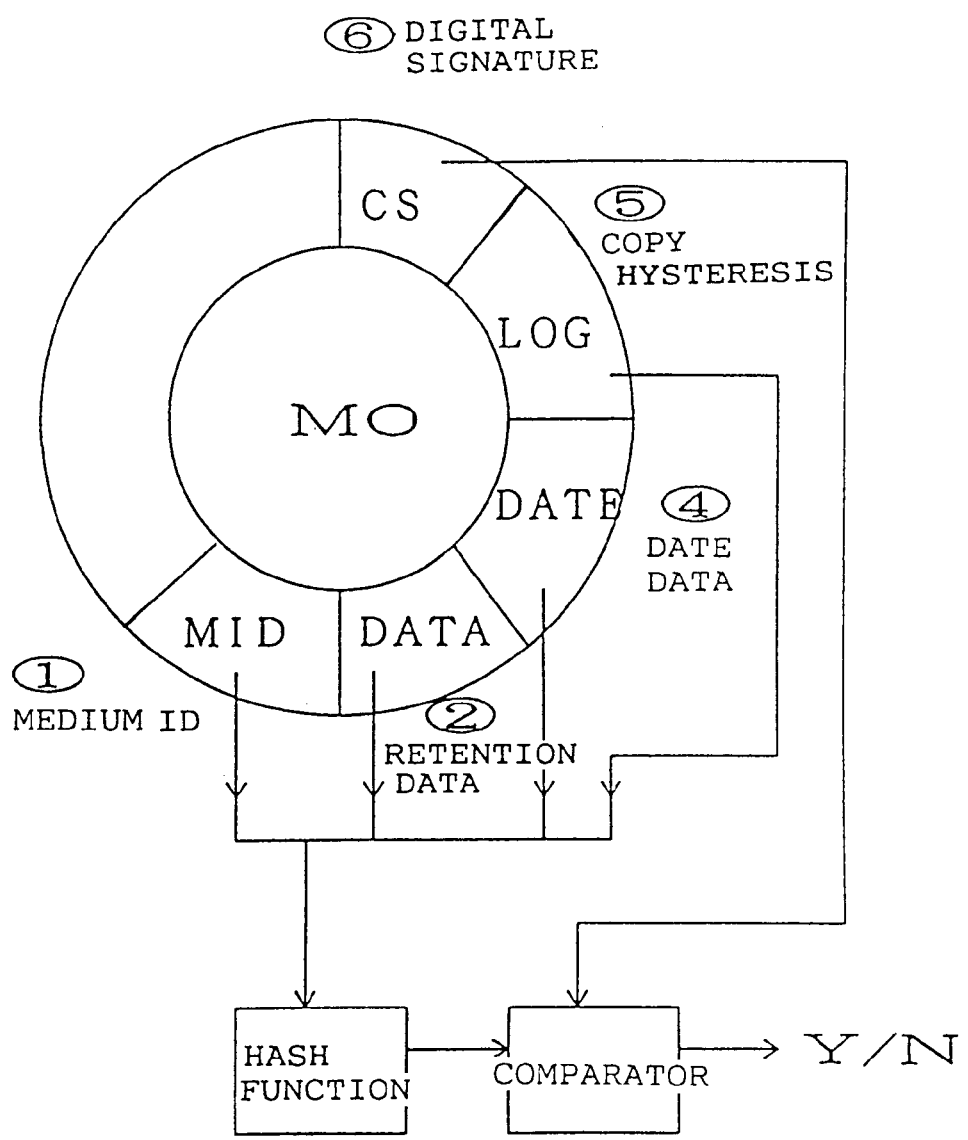
FIG. 4 is an explanatory diagram showing an outline of procedures of verifying the data retained by the data retaining apparatus in the embodiment.

Then, when verifying the data, as schematically shown in FIG. 4, there is obtained a hash function output when inputting "MID", "DATA", and "LOG" and "DATE" relative to this item of "DATA", which are retained on the disk MO. Subsequently, this hash function output is compared with "CS" pertaining to "DATA" on the disk MO, thereby judging whether "DATA" were falsified or not. Namely, if the hash function output is coincident with "CS", it is judged that "DATA" were not falsified. Whereas if not coincident with each other, a judgement is that "DATA" were falsified.

The data retaining apparatus in the embodiment incorporates an accumulation authenticator generating function in addition to the above-described data retaining function and data verifying function. Hereinafter, the accumulation authenticator generating function of the data retaining apparatus in the embodiment will be described with reference to function block diagram etc as well as giving by far more specific explanations of the data retaining function and the data verifying function.

Figure 5:
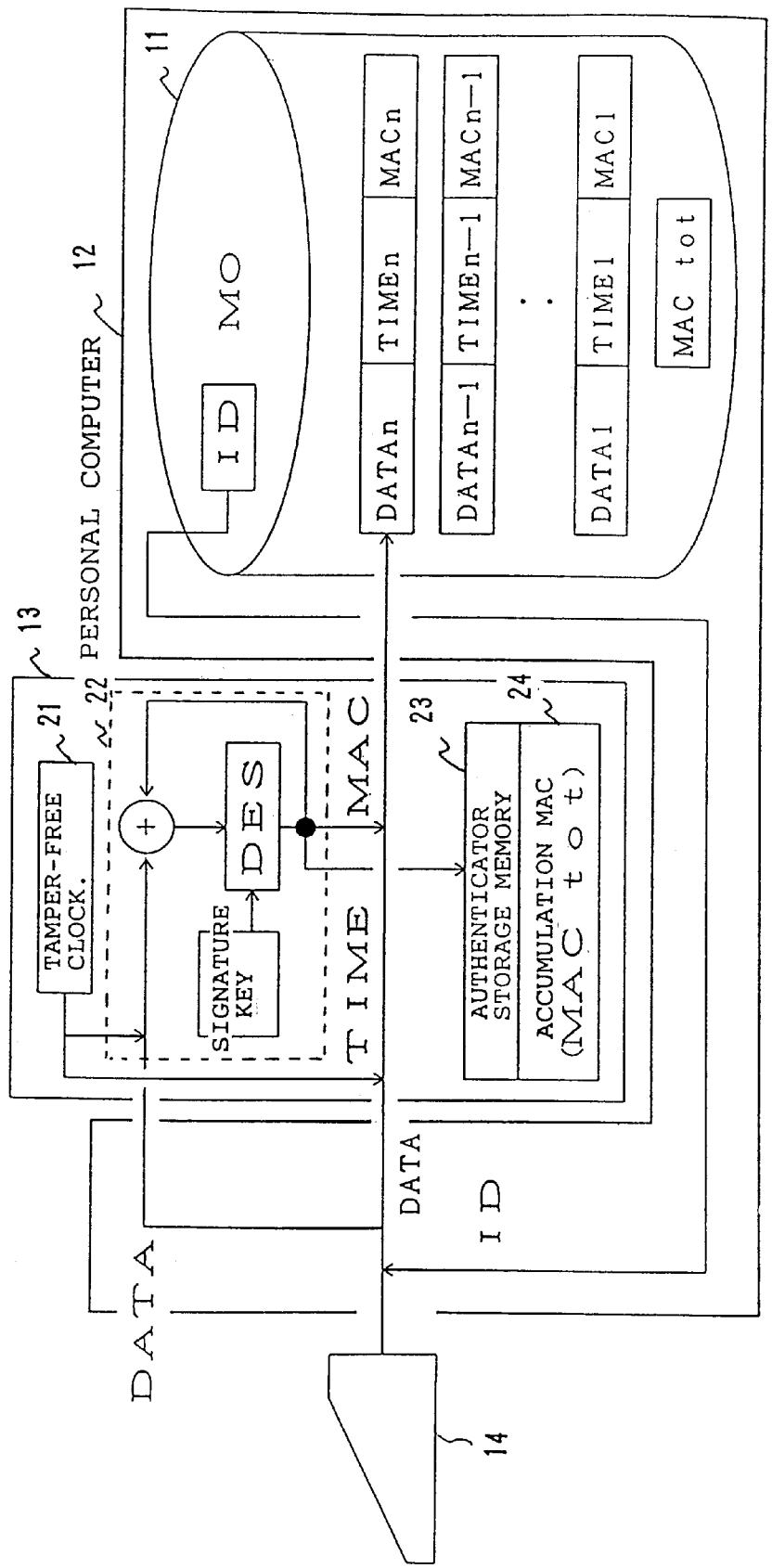
FIG. 5 is an explanatory function block diagram showing a data retaining function of the data retaining apparatus in the embodiment.

FIG. 5 is a function block diagram of the data retaining apparatus in the embodiment. Note that this function block diagram shows only the functions when retaining the data on the disk MO (when in a signature process). Referring to FIG. 5, however, the representation of the hysteresis information is omitted.

As shown in FIG. 5, the data retaining apparatus in the embodiment is actualized by connecting a document management PC card 13 in charge of generating the authenticator to a personal computer (PC) 12 including an MO drive 11.

When retaining the data on the disk MO, DATA created by use of a keyboard 14 is written to the disk MO in the MO drive 11 through the PC 12. Simultaneously with writing DATA to the disk MO, the PC 12 supplies the document management PC card 13 with the medium ID and DATA that are stored on the disk MO. The medium ID and DATA are supplied to the authenticator generating mechanism 22 in the document management PC card 13. The authenticator generating mechanism 22 starts a process of generating an authenticator MAC by use of the data supplied thereto. The document management PC card 13, after a completion of receiving DATA, supplied the PC 12 and the authenticator generating mechanism 22 with a output (TIME) of the tamper-free clock 21. Then, the authenticator MAC outputted by the authenticator generating mechanism 22 as a result of inputting the medium ID, DATA and TIME, is supplied to the PC 12 and at the same time stored in an authenticator storage memory 23. The PC 12 supplied with TIME and MAC writes these pieces of data to the disk MO, and an item of information consisting of DATA, TIME and MAC is retained on the disk MO.

Further, if the disk MO comes to have no area for storing the data after having written DATA thereto, the document management PC card 13 executes a process of generating an accumulation authenticator (accumulation MAC, MAC tot) using the authenticator stored in the authenticator storage memory 23, and MAC tot is written to the disk MO through the PC 12. This accumulation authenticator generating process is executed by making use of the authenticator generating mechanism 22.

Figure 6:
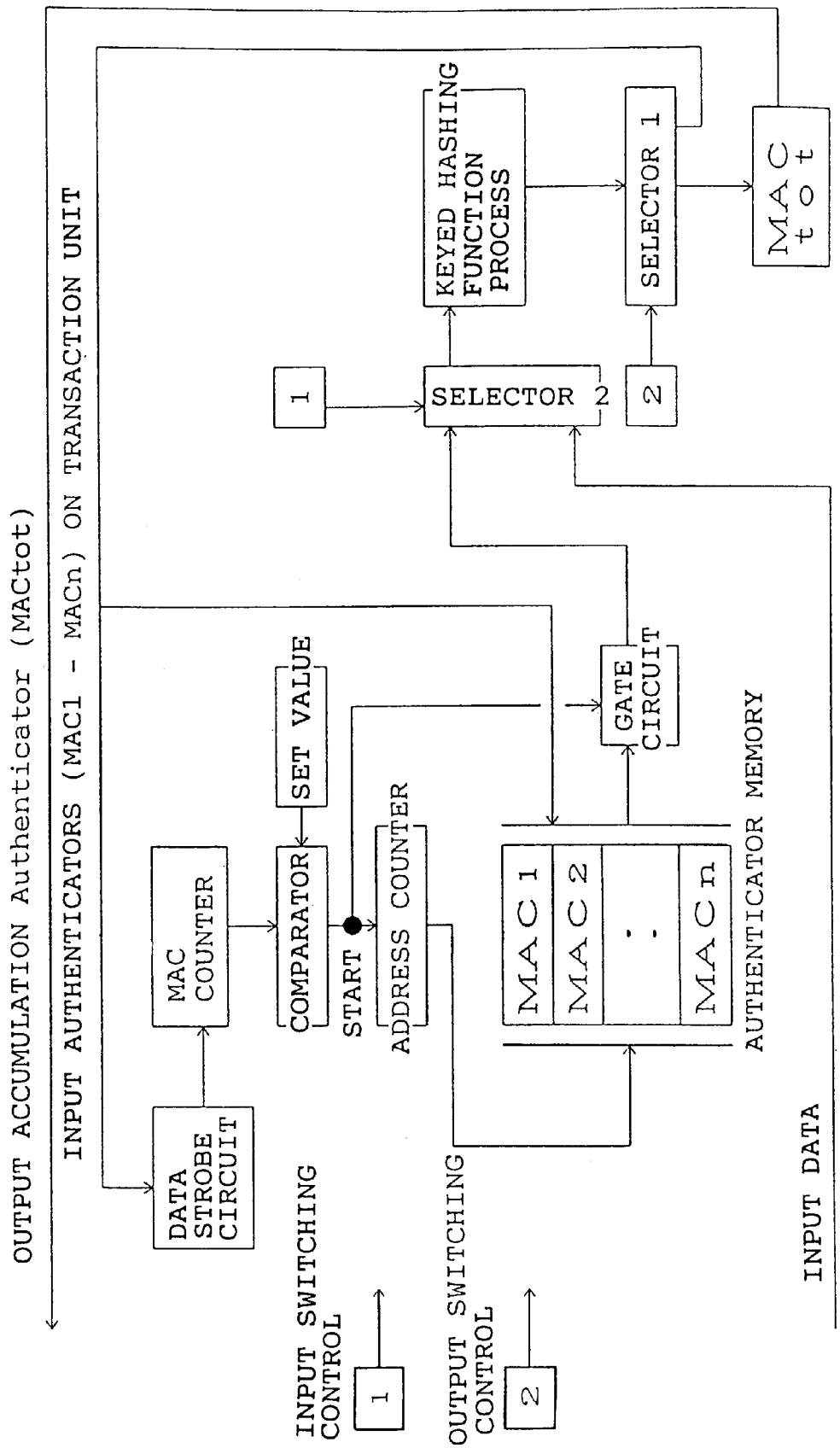
FIG. 6 is an explanatory function block diagram showing an accumulation authenticator generating function incorporated into a document management PC card defined as a constructive element of the data retaining apparatus in the embodiment.

Hereinafter, the authenticator generating operation and the accumulation authenticator generating operation by the document management PC card 13, will be explained with reference to FIG. 6. Incidentally, FIG. 6 is a function block diagram showing more specifically the construction of the document management PC card 13, wherein a block, including the keyed hashing function processing unit, corresponds to the authenticator generating mechanism 22 in FIG. 5.

When generating the authenticator, a selector 2 is controlled by an input switching control signal to supply the keyed hashing processing unit with data inputted from outside. Further, a selector 1 is controlled by an output switching control signal to supply an authenticator memory with data from the keyed hashing processing unit, and, as a result, the generated authenticator is stored in the authenticator memory as well as generating the authenticator as described above.

On the other hand, when generating the accumulation authenticator, the selector 2 is controlled by the input switching control signal to supply the keyed hashing processing unit with data from a gate circuit. Further, the selector 1 is controlled by the output switching control signal to supply the authenticator memory with a predetermined number of pieces of data outputted from the keyed hashing processing unit and to thereafter output, as MAC tot, the data outputted from keyed hashing processing unit. Then, when starting the accumulation authenticator generating process, a start pulse is supplied to an address counter and a gate circuit.

The address counter supplied with the start pulse starts controlling the authenticator memory to sequentially output the authenticators MAC stored therein. The gate circuit supplied with the start pulse comes into an ON-status and supplies the selector 2 with MAC from the authenticator memory. As a result, the data outputted by the keyed hashing function processing unit are inputted to a data strobe circuit via the selector 1. The MAC counter counts strobe signal outputs of the data strobe circuit, and outputs a counted result to a comparator. The comparator compares the data from the MAC counter with a set value and outputs, if these two values are coincident, a stop pulse to the address counter and the gate circuit.

Figure 7:
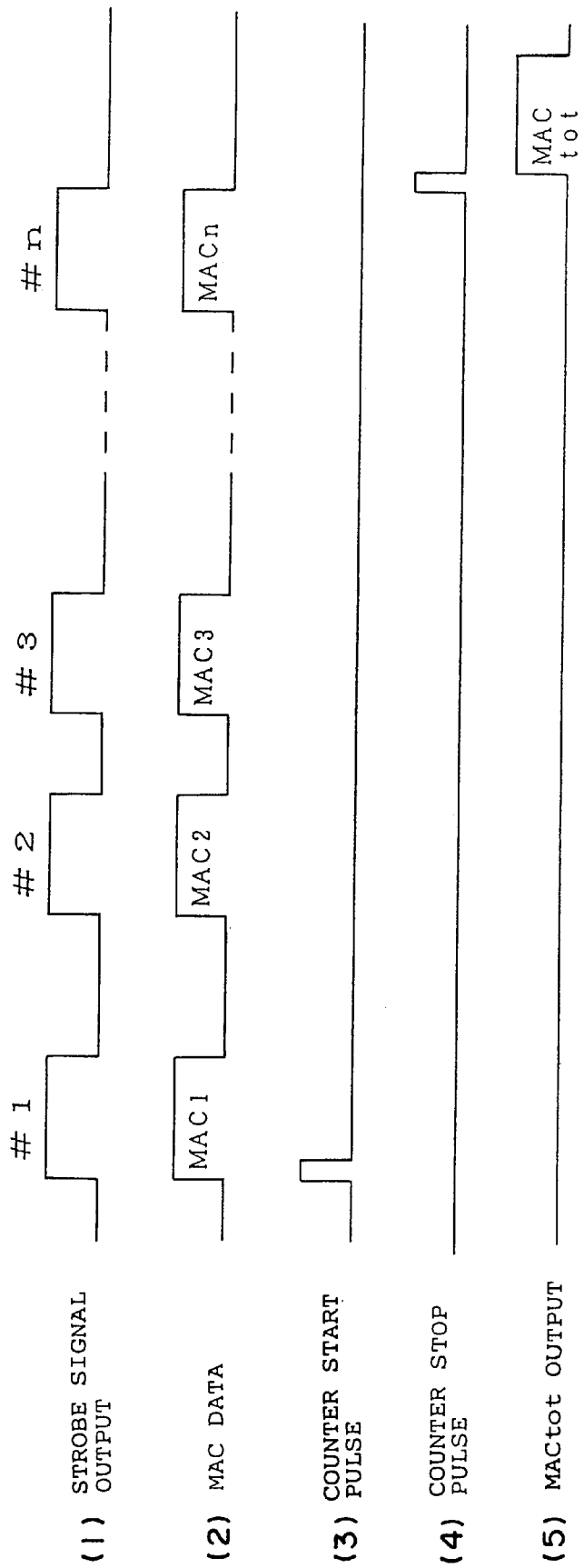
FIG. 7 is an explanatory timing chart showing an accumulation authenticator generating function of the document management PC card.
Figure 8:
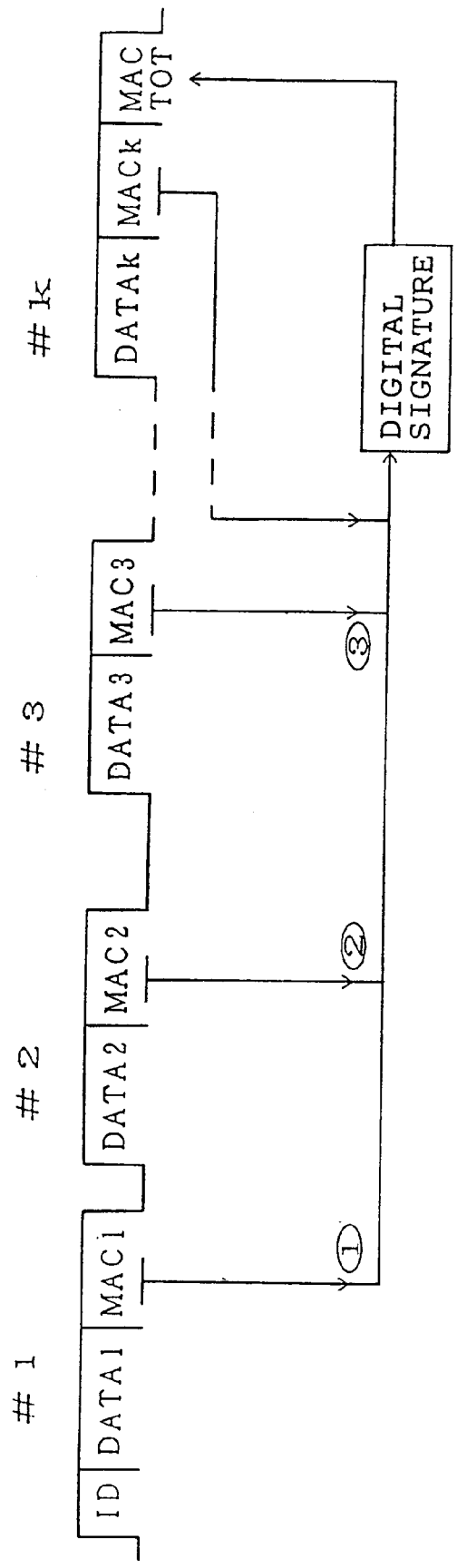
FIG. 8 is a schematic diagram showing a relationship between an accumulation authenticator and an authenticator.

Namely, when in the accumulation authenticator generating process, the accumulation authenticator (MAC tot) is generated at a timing as shown in FIG. 7 within the document management PC card 13. Then, the generated MAC tot is retained on the disk MO by the PC 12, and hence, as schematically shown in FIG. 8, a digital signature created by use of MAC relative to all DATA stored on the disk MO is eventually retained as MAC tot on the disk MO.

Note that the data retaining apparatus in the embodiment also has a function of imparting the accumulation authenticator to the data on the disk MO per group other than the function of imparting the accumulation authenticators relative to all the data on the disk MO. This function, though a detailed explanation thereof will be given later on, is substantially a function obtained by adding the function of designating the data for creating the accumulation authenticator, toto the above-described accumulation authenticator imparting function.

Figure 9:
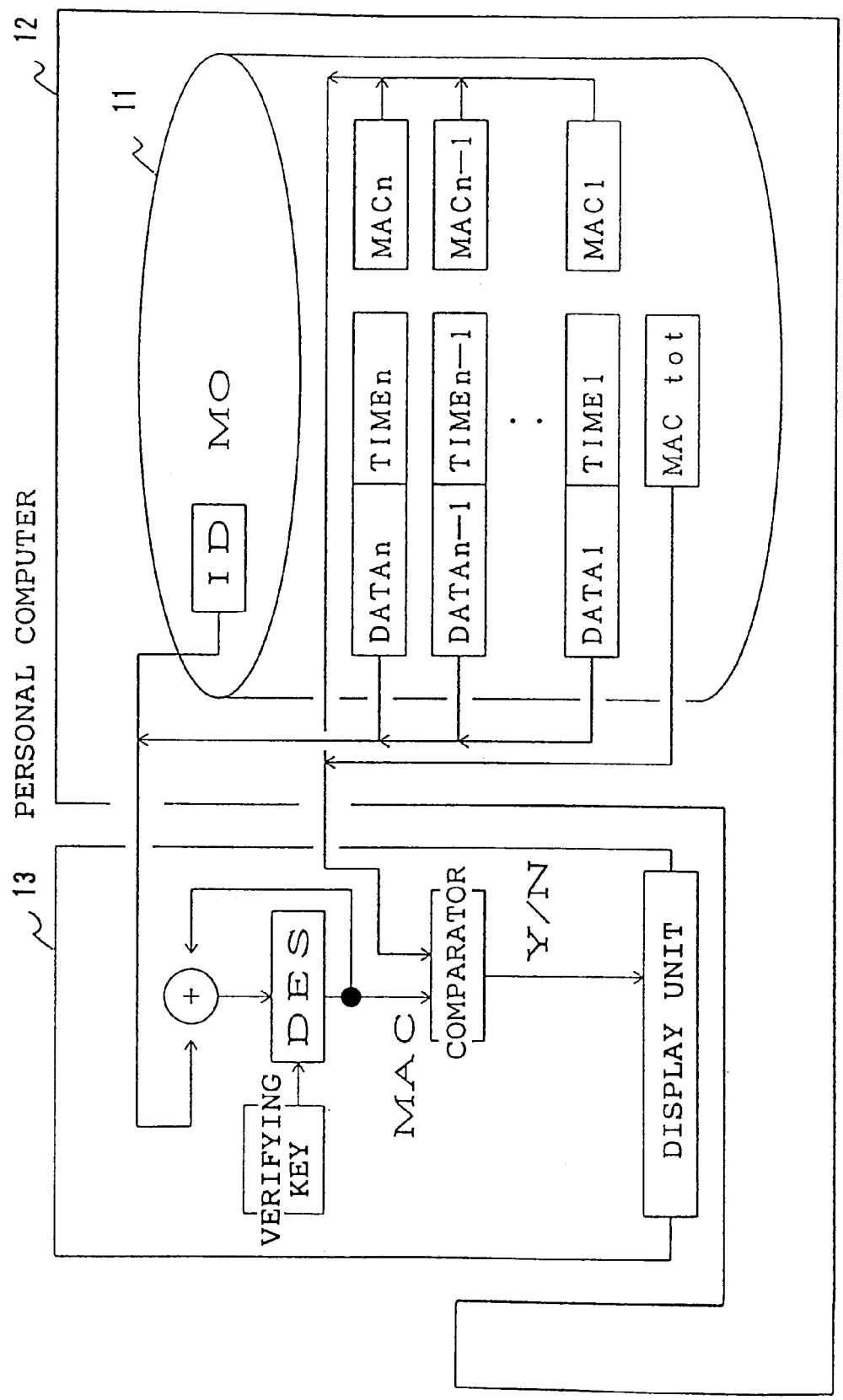
FIG. 9 is an explanatory function block diagram showing a data verifying function of the data retaining apparatus in the embodiment.

Next, an operation when verifying the data of the data retaining apparatus in the embodiment will be described with reference to a function block diagram shown in FIG. 9.

When verifying the data, the PC 12 reads DATA indicated to be verified, and MAC and TIME pertaining to item of DATA from the disk MO, and supplies theses pieces of data to the document management PC card 13. The document management PC card 13 creates the authenticator MAC from the thus supplied DATA and TIME, and compares the created MAC with the supplied MAC. Then, if the two authenticators MAC are identical with each other, the display unit displays that DATA concerned is data that has not been falsified. Whereas if not identical, the display unit displays that DATA concerned is data that has been falsified. Further, the document management PC card 13 notifies the PC 12 of the same purport.

Further, when indicated to make a verification using the accumulation authenticator, the PC 12 reads all pieces of DATA and TIME from the disk MO and supplies them to the document management PC card 13 as well as supplying the card 13 with MAC tot on the disk MO. The document management PC card 13 creates MAC from all pieces of DATA and TIME supplied, and compares the thus created authenticator MC with MAC tot supplied. Then, if these two pieces of data are coincident with each other, the display unit displays that each piece of DATA on the disk MO is unfalsified data, and notifies the PC 12 of this purport. Whereas if not coincident, the display unit displays that some sort of falsification of the data is taking place on the disk MO, and notifies the PC 12 of this purport.

Figure 23:
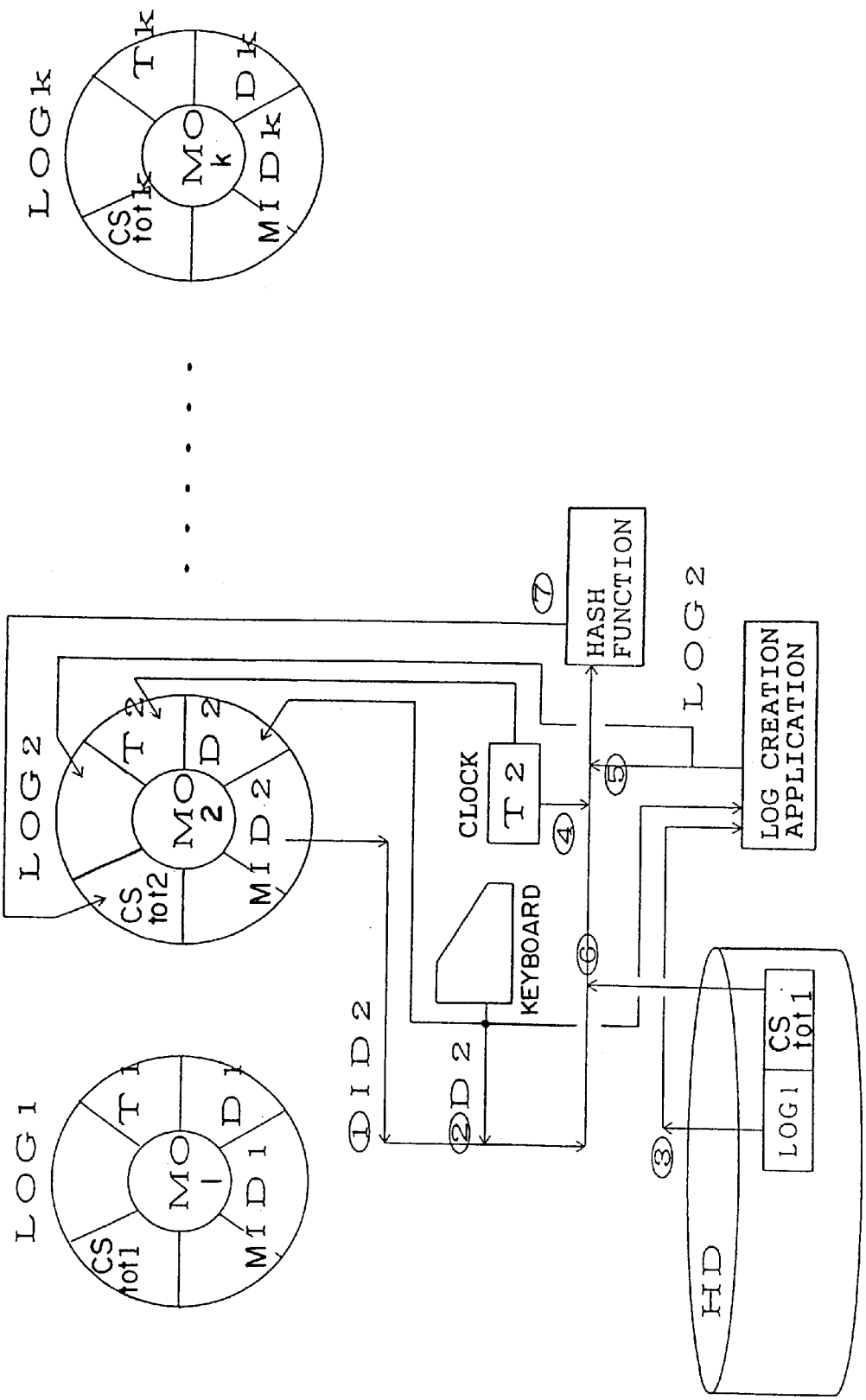
FIG. 23 is a conceptual diagram of data management between mediums in the embodiment.

FIG. 23 shows a concept of the data management between a plurality of mediums. If a disk MO1 has no data free area, and a disk MO2 is to be used from the next data input process, in which case accumulation hysteresis information (LOG1) of the MO1 and an accumulation authenticator (CStot1) of the MO1 are temporarily recorded in a hard disk (HD) of the personal computer. Then, when a new item of data (D2) is inputted from the keyboard, this item of data (D2) is written to a user data area of the second disk MO2, and simultaneously accumulation hysteresis information (LOG2) is generated based on a medium identification number (MID2) of the MO2, the user data (D2), and the accumulation hysteresis information (LOG1) and the accumulation authenticator (CStot1) of the first disk MO1 stored in the hard disk (HD). This accumulation hysteresis information (LOG2) is stored in an accumulation hysteresis information area. Further, simultaneously with this process, those pieces of data are processed by the hash mechanism (HASH), thereby generating an authenticator (CStot2) of the MO2. Thus, the accumulation authenticator (CStot2) stored on the second disk MO2 is generated from the accumulation authenticator (CStot1) of the first disk MO1, and therefore, if any one of documents on the first disk MO1 was falsified, it follows that mismatching happens in the accumulation authenticators on the whole.

As described above, it is feasible to verify a validity of the data content even between the plurality of mediums.

Hereinafter, the write-once function of the data retaining apparatus in the embodiment will be specifically described. When in the write-once process, the above-mentioned document management PC card functions as a write-once/signature/verifying module. The basic operation of the write-once/signature/verifying module when retaining the single piece of data, is the same as the one already explained. When in the write-once process, however, the number of versions is also retained, so that the write-once/signature/verifying module operates as follows.

When recording the data at the first time, the write-once/signature/verifying module, as shown in FIG. 10(a), receives, from the medium storage remaining quantity judging device (the PC 12), a notification as to whether there is left a capacity enough to store the data ((1)). The write-once/signature/verifying module notified of the capacity being left (ON) obtains the medium ID, the number of versions and the data ((2)–(4)). Then, the write-once/signature/verifying module, which has obtained the medium ID, the number of versions and the data, generates a date and an authenticator ((5), (6)). That is, the write-once/signature/ verifying module, as schematically shown in FIG. 10(b), outputs the hash function processed value (the authenticator) of the data, the number of versions, the medium ID and the date outputted by the tamper-free clock. Then, these pieces of data are written to the MO by the PC. Further, the PC also executes a process of storing a work medium (the hard disk in the data retaining apparatus in the embodiment) with, as one element of accumulation hysteresis information, an item of information consisting of the number of versions, the date and the authenticator written to the MO, the medium ID of the MO, and information (on the user of the PC) on the creator of the data written to the MO. Incidentally, the accumulation hysteresis information will be described in greater detail.

Next, when writing the data, as shown in FIG. 11(a), the write-once/signature/verifying module, to begin with, obtains the medium ID, the number of versions, the data, the date and the authenticator ((2)–(6)). Then, the same module issues the number of versions after confirming that the authenticator corresponds to other information ((7)). More specifically, the write-once/signature/verifying module, as schematically shown in FIG. 11(b), judges whether or not the hash function processed value (authenticator) of the medium ID, the number of versions and the data given from the PC, is coincident with the authenticator given from the PC. If these two are coincident with each other, a value obtained by adding "1" to the number of versions is outputted as the number of versions of the data to be written this time. Thereafter, the write-once/signature/verifying module and the PC execute the same processes as those explained referring to FIG. 10, thereby storing the MO with the information consisting of the number of versions, the data, the date and the authenticator. Further, the PC, in this case also, executes the process of storing the work medium with, as one element of the accumulation hysteresis information, an item of information consisting of the number of versions, the date and the authenticator written to the MO, the medium ID of the MO, and data creator information written to the MO.

If there is no data storage area on the MO as a result of repeating the above processes, as shown in FIG. 12(a), the medium storage remaining quantity judging device (the PC) notifies the write-once/signature/verifying module of this purport ((1): OFF). The write-once/signature/verifying module notified of this obtains a content of the last authenticator ((2)). Further, the PC retains in the MO the accumulation hysteresis information stored on the work medium ((3)), and supplies the accumulation hysteresis information to the write-once/signature/verifying module ((4)). The write-once/signature/verifying module, as schematically shown in FIG. 12(b), generates an accumulation authenticator from the accumulation hysteresis information and the obtained accumulation authenticator. Then, the PC writes, to the MO, an end code and the accumulation authenticator generated by the write-once/signature/verifying module ((5), (6)).

The accumulation hysteresis information and the accumulation authenticator retained in the MO will be explained more specifically. Note that the first version medium is different from the second and subsequent mediums in terms of contents of the accumulation historical information. Therefore, herein, the accumulation hysteresis information and the accumulation authenticator retained on the MO will be explained by exemplifying a case where the write-once process is executed on three pieces of mediums.

As shown in FIG. 13(a), if two pieces of data are retained on the first version medium the medium ID of which is 2125, the first version medium is stored with accumulation hysteresis information consisting of a serial number 001 indicating that the medium concerned is the first version medium, the medium ID 2125 of this medium, and two tuples of information collected when retaining the data. Further, the first version medium is also stored with an authenticator created as an accumulation authenticator by use of the above accumulation hysteresis information.

A second version medium 1003 is, as shown in FIG. 13(b), stored with an item of hysteresis information consisting of the hysteresis information of the first version medium ID2125 and the hysteresis information of the medium 1003. Then, a third version medium 2108 is, as shown in FIG. 13(c), stored with an item of hysteresis information consisting of the hysteresis information of the second version medium 1003 and the hysteresis information of the medium 2108.

Figure 14:
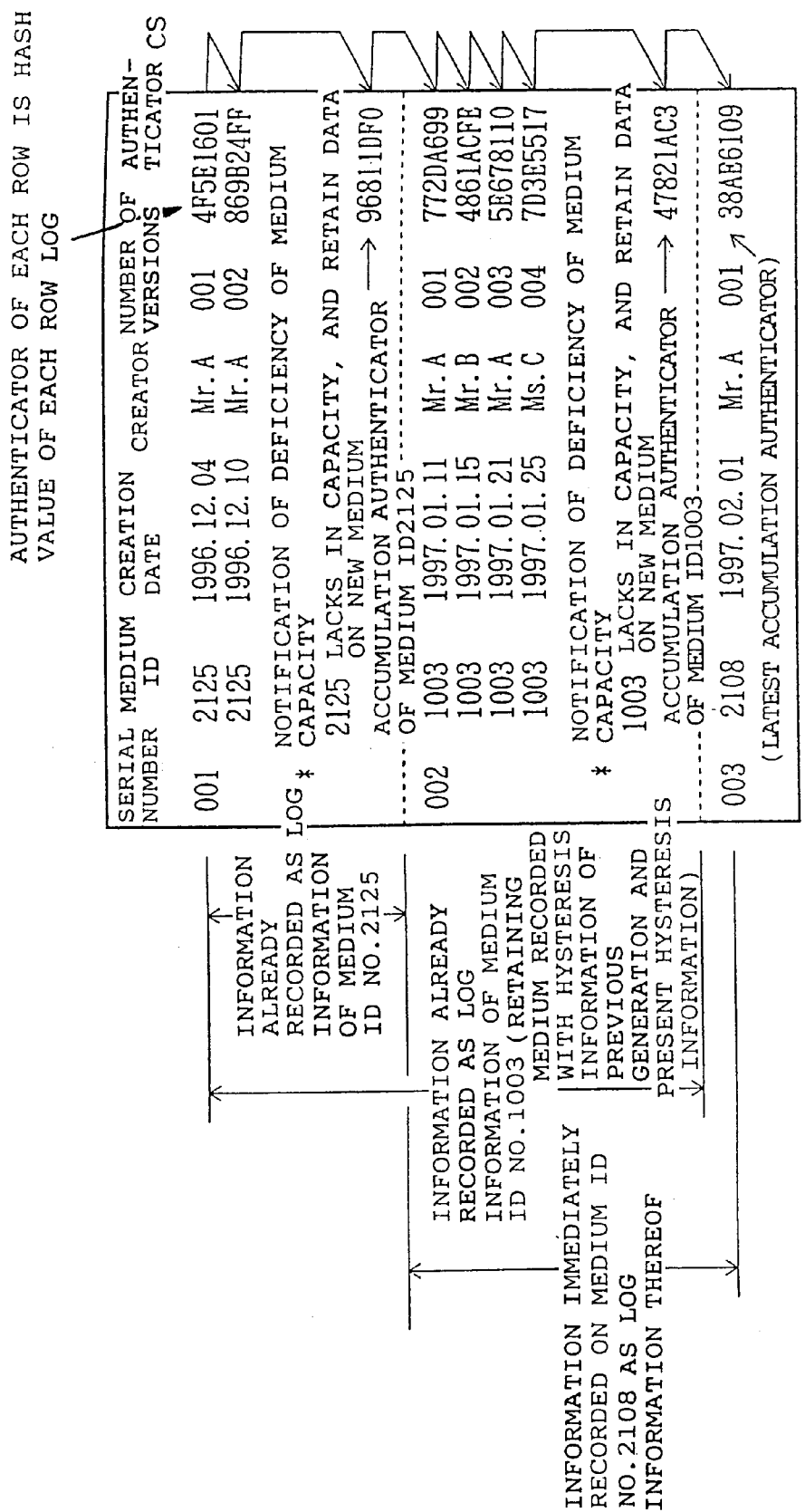
FIG. 14 is an explanatory diagram showing a mutual relationship between the accumulation authenticators stored on a plurality of retaining medium on which the write-once processes are executed by the data retaining apparatus in the embodiment.

Namely, as schematically shown in FIG. 14, the first version medium is stored with the hysteresis information on the medium itself, and the other mediums excluding the first version medium are stored with the hysteresis information of the medium of one generation before and the hysteresis information on the medium itself.

The data reading process when verifying the data is executed in the same procedures as those explained with reference to FIG. 9 and so on. To be specific, as shown in FIGS. 15(a) and 15(b), the write-once/signature/verifying module obtains the medium ID, the number of versions, the data, the date and the authenticator, and compares a value of the authenticator with a hash function processed value of the medium ID, the number of versions, the data and the date. Then, if these two values are coincident with each other, the display unit displays a purport that no falsification is made, and the PC is notified of this purport.

FIGS. 24–27 are flowcharts for executing the process with the accumulation hysteresis information (LOG) and the accumulation authenticator (CStot) between the plurality of mediums.

At first, when the MO is loaded into an unillustrated MO drive device, whether or not this MO is the disk for retention is judged (step 2401). This judging method can be simply actualized by a process such as setting a flag in a predetermined address of a management area on the MO for, e.g., the retention-purposed MO. Further, a definition may be given each time the user initializes the MO. Then, if the relevant MO is not the retention-purposed disk, the management which will hereinafter be mentioned is not required, and hence the general medium process (which does not restrict the read and write of the data) is executed (2403).

If it is judged in step 2401 that the medium is the retention-purposed medium, whether or not this MO is a new disk for registering the document is judged (2402). The judgement can be made by detecting, specifically, whether the accumulation authenticator (CStot) exists on the same MO, alternatively whether or not even one document is registered on the same MO.

Then, if not the new medium, i.e., if the medium is the one that has already been registered with the document, whether or not the medium has a free area enough to register a new document is judged (2405). Then, if deficient in the free area, a notification of the capacity deficiency is displayed on the display unit (DISP) such as CRT display, thus finishing the process.

In step 2402, if the loaded MO is new, the accumulation hysteresis information (LOG) of the medium of one generation before is temporarily stored on the work medium of the hard disk device or a main memory of the relevant personal computer (2404). In this step, an indication of prompting the user to load the MO of one generation before each time a new MO is loaded, may be displayed on the display unit (DISP), and the accumulation hysteresis information (LOG) of the previous generation may be acquired by loading the MO of one generation before into the MO drive device.

Judged next is whether or not the accumulation authenticator (CStot) is obtained from the accumulation hysteresis information of the MO of one generation before (2407). If not obtained, the accumulation hysteresis information (LOG) of one generation before is rewritten onto the work medium, and the accumulation authenticator (CStot) is generated from this written content (2408).

Thereafter, the processes may be different depending on a process of creating the data (shifting to FIG. 27), a process of creating the authenticator of the data created on the MO (shifting to FIG. 25) or a process of verifying whether or not the data is falsified on the MO (shifting to FIG. 26) (2409–2413).

When creating new data, i.e., when registering a new document on the MO (FIG. 27), to begin with, the data inputted from the keyboard (KEY) or a separate medium are temporarily written to the work medium (the hard disk) of the personal computer (2701).

Then, when there is given an indication of writing the relevant created data to the retention medium (MO) (2702), the tamper-free clock automatically issues time data at that time, and this piece of time data is inserted in a tail part of the created data and inputted to the hash mechanism (HASH) (2703).

Next, a medium identification number (MID), a data creator and the number of versions are automatically generated on the personal computer, and these pieces of information are written as the accumulation hysteresis information (LOG) to the concerned MO (2704).

Subsequently, in the personal computer, the medium identification number (MID), the created data (DATA), the time data (TIME) and the accumulation hysteresis information (LOG) are read (2705). Then, these pieces of data are processed by the hash mechanism (HASH) (2706) and written as an authenticator (CS) to the concerned MO (2707).

Figure 27:
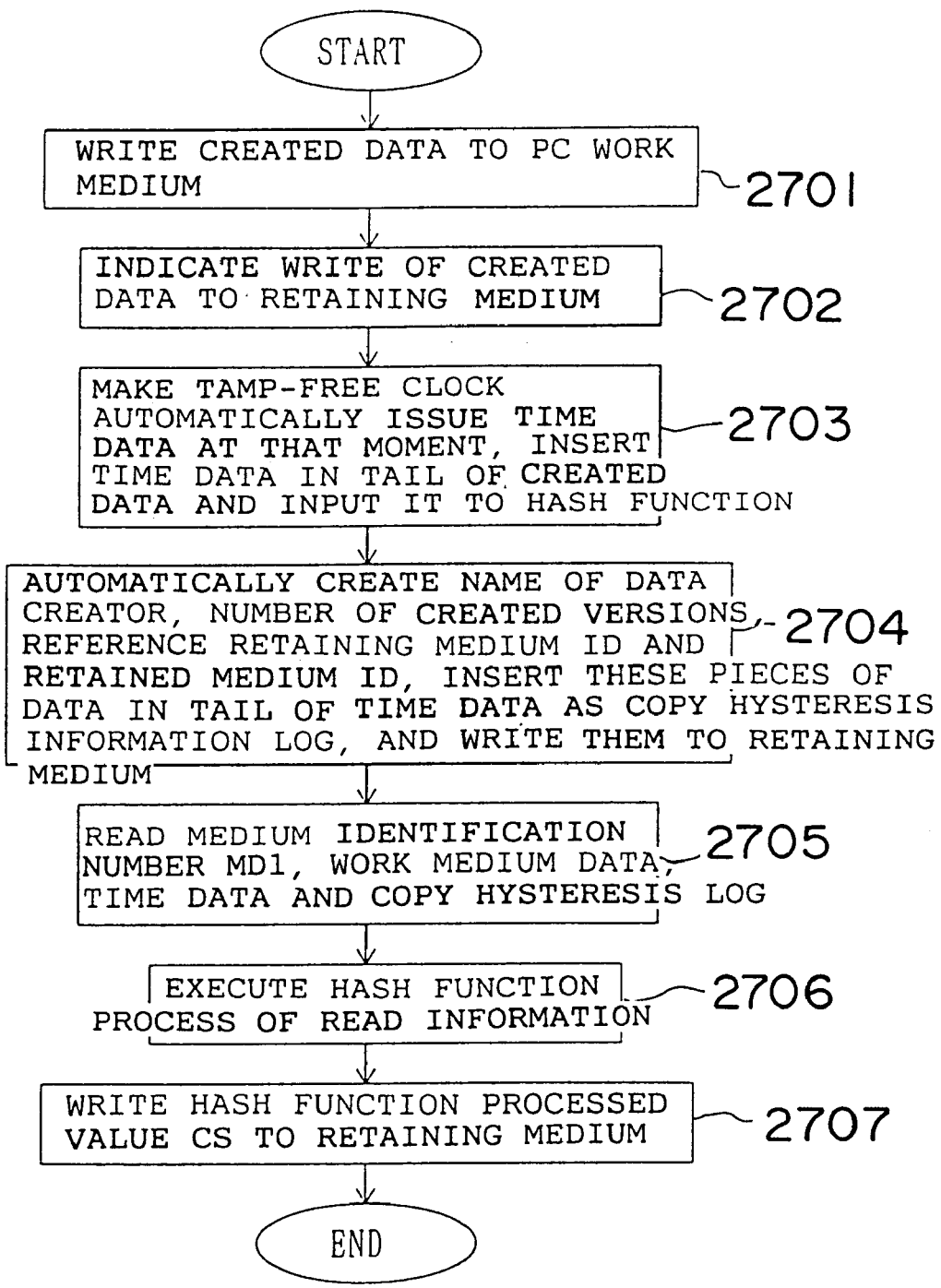
FIG. 27 is a flowchart showing a process of creating the data on the MO.

A series of these processes shown in FIG. 27 are actualized by the construction of the hardware explained in FIG. 5.

Figure 25:
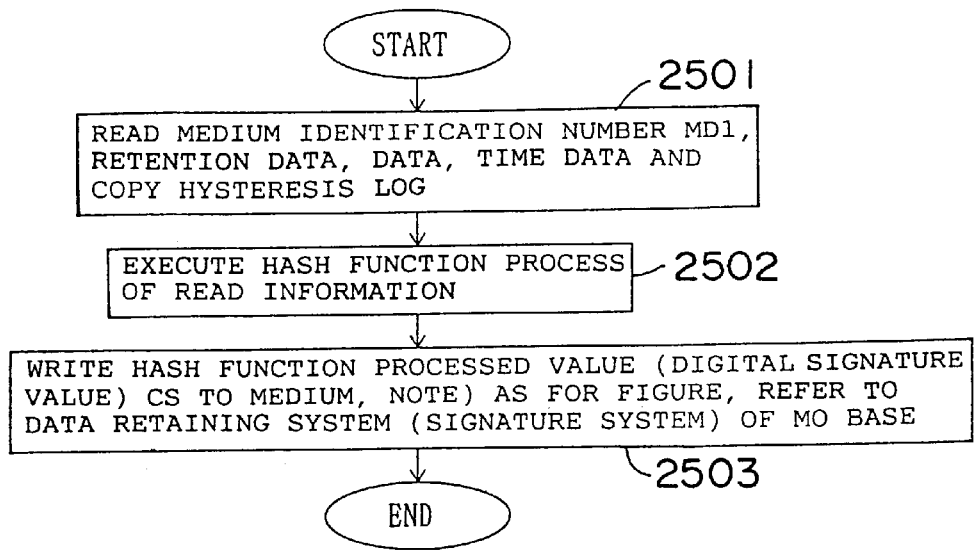
FIG. 25 is a flowchart showing a process of creating the authenticator created on the MO.

On the other hand, when the authenticator (CS) or the accumulation authenticator (CStot) is imparted to the data already created on the MO, the processes are executed as shown in a flowchart of FIG. 25.

That is, the medium identification number (MID), the created data (DATA), the time data (TIME) and the accumulation hysteresis information (LOG) are read from the work medium in the personal computer (2501), and processed by the hash mechanism (HASH) (2502), thereby obtaining the authenticator (CS). The authenticator (CS) is then written to the concerned MO (2503). These processes shown in FIG. 25 are significant as signature processes for perpetually retaining the data registered.

Figure 26:
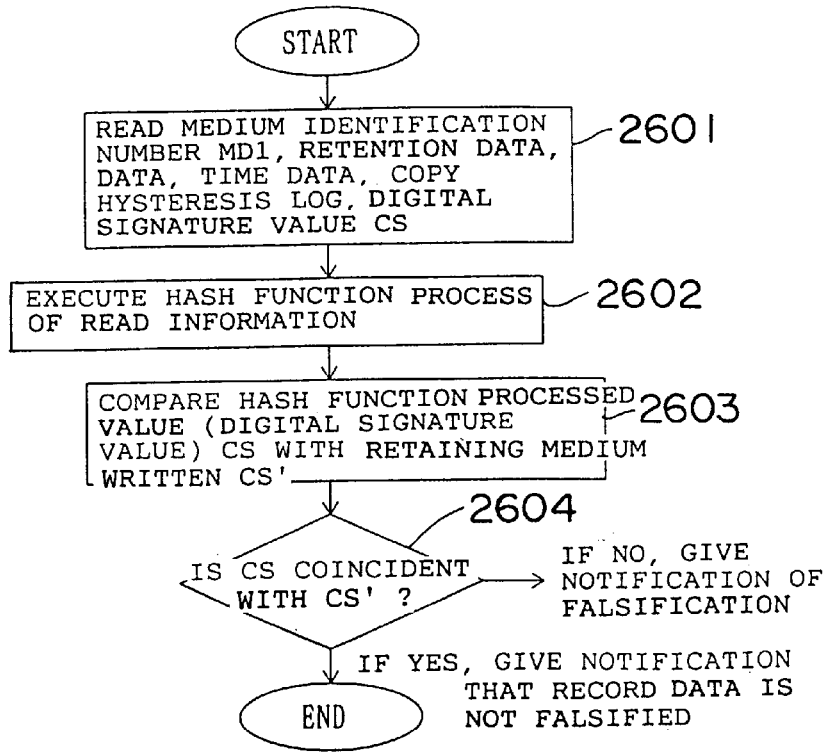
FIG. 26 is a flowchart showing a process of verifying whether or not the data is falsified on the MO.

The validity as to whether or not the data already created on the MO are falsified, can be verified based on a flowchart shown in FIG. 26. The construction of the hardware for actualizing this process is given as explained in FIG. 9.

To be specific, when a verifying target MO is loaded into the MO drive device, to start with, the medium identification number (MID), the created data (DATA), the time data (TIME) and the accumulation hysteresis information (LOG) are read from the work medium (2601), and processed by the hash mechanism (HASH) (2602). A comparator (COMP) compares a value of the result of this process with a value of the authenticator (CS) and a value of the accumulation authenticator (CStot) (2603). If these two values are coincident with each other, the display unit (DISP) displays that no falsification is made, i.e., the data are valid. Whereas if these two values are not coincident, the display unit displays a purport that the data are invalid on the presumption that the data (DATA) or the time data (TIME) is falsified, or that an intermediate medium is disposed of (2604).

Next, a supplementary explanation of the operations of the data retaining apparatus discussed above will be given.

Figure 16:
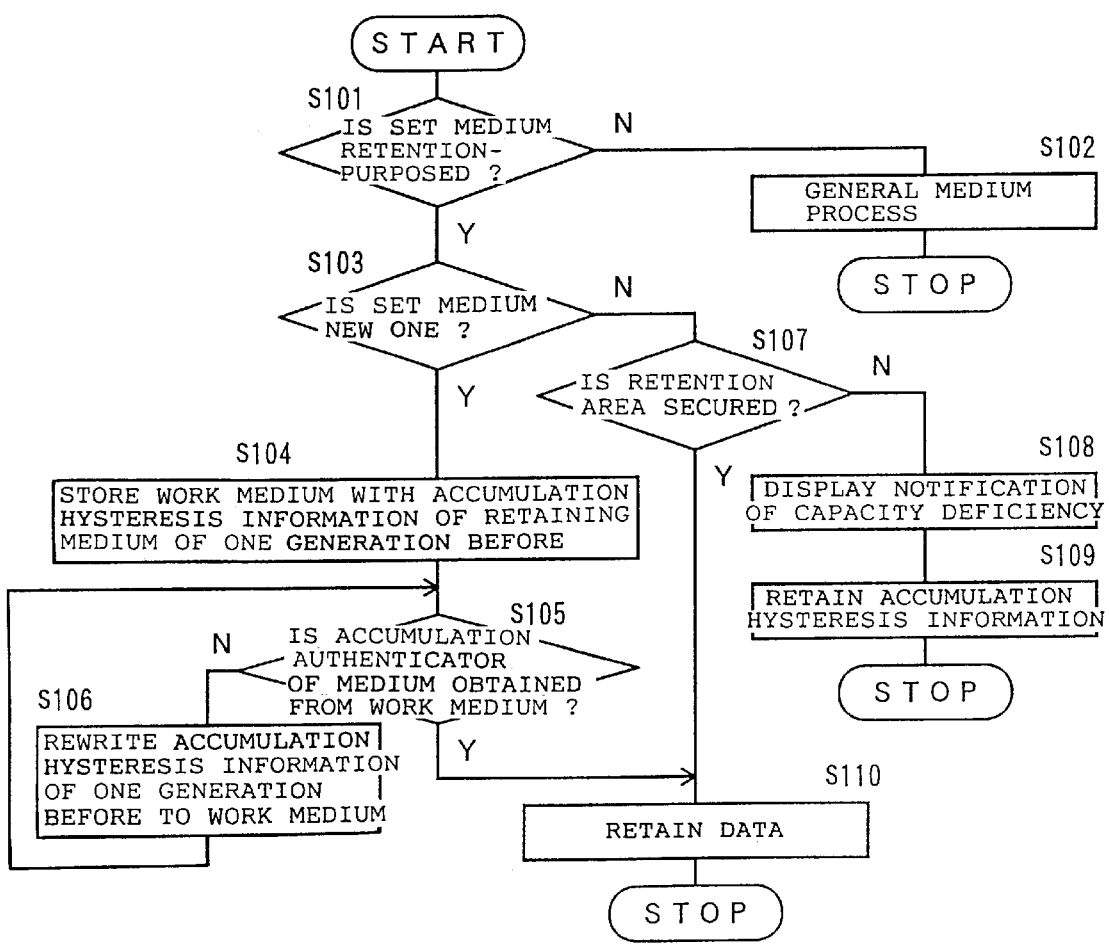
FIG. 16 is a flowchart showing operation procedures of the data retaining apparatus in the embodiment when making a request for writing the data to the MO.

FIG. 16 shows a flow of the operations of the data retaining apparatus when data write is requested of the MO. As already explained, the process is classified roughly into the general medium process and the retention-purposed medium process. When the data write is requested, the PC executes the general medium process (step S102) of the set medium is not the retention-purposed medium (step S101; N).

While on the other hand, if the set medium is the retention-purposed medium (step S101; Y), and when this medium is new medium (step S103; Y), the PC stores the work medium with the accumulation hysteresis information of the retention medium of one generation before (step S104). After confirming from the accumulation hysteresis information of the work medium that the accumulation authenticator of the retention medium of one generation before is to be obtained (step S105; Y), the processing proceeds to step S109. If this accumulation authenticator is not obtained (step S105; N), the work medium is restored with the accumulation hysteresis information of the retention medium of one generation before (step S106), and processing returns to step S105. Note that if the set medium is the first version medium, the PC does not execute those processes.

If the set medium is not the new medium (step S103; N), the PC judges whether or not the retention area is secured (step S107). Then, if the retention area is not secured (step S107; N), the PC notifies the document management card (the write-once/signature/verifying module) of the capacity deficiency and displays this notification (step S108). Then, the PC executes the retention process of the above accumulation hysteresis information (step S109), and the processing comes to an end. Note that when the notification of the capacity deficiency is displayed, it follows that a new medium is set in the MO drive 11 by the user.

Figure 17:
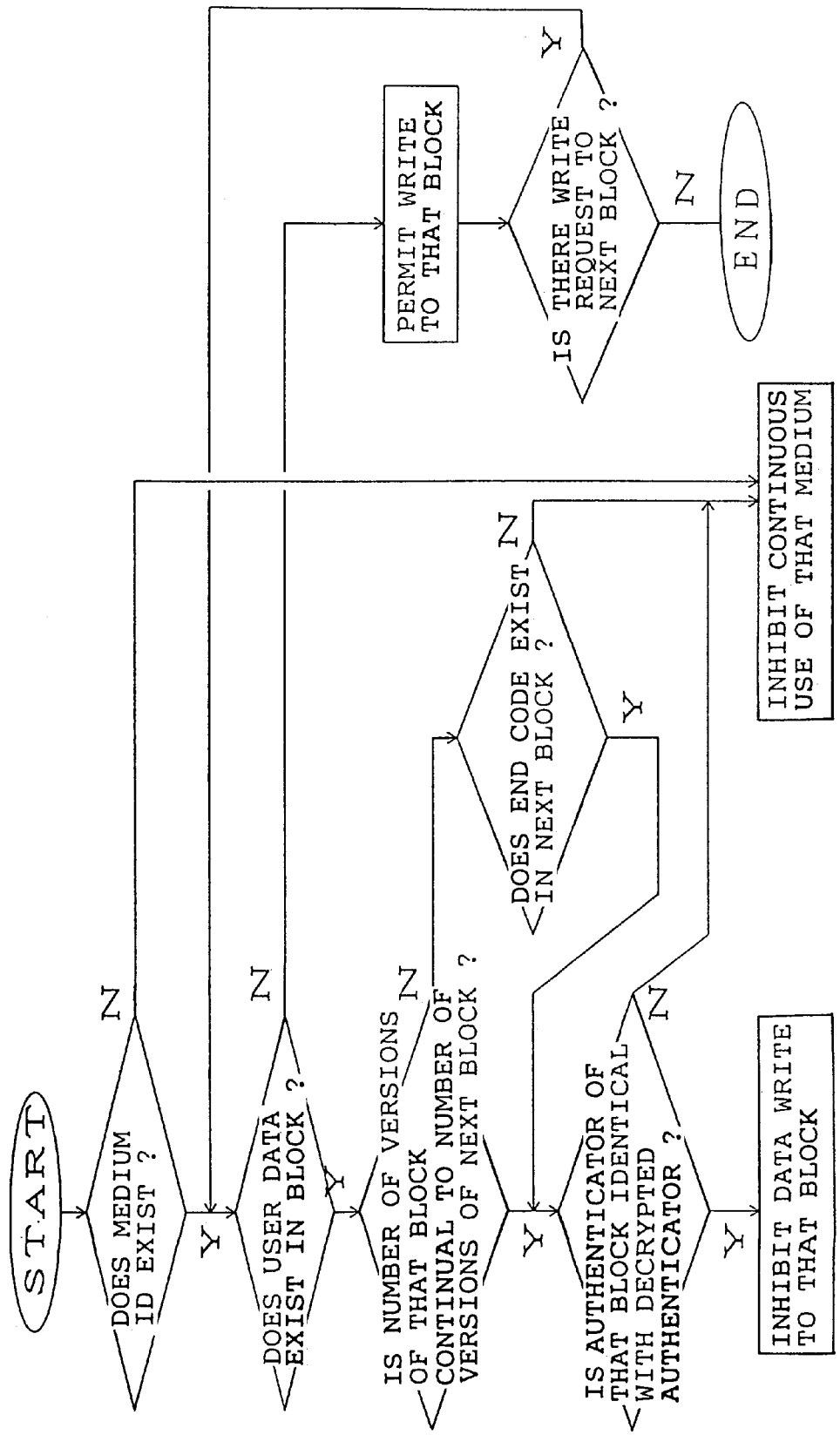
FIG. 17 is a supplementary flowchart showing the write-once operation in the data retaining apparatus in the embodiment.

If the retention area is secured (step S107; Y), the PC moves forward to step S110 and executes the data retention process in the already-explained procedures (step S111). Then, the processing comes to an end. Note that the data retention implemented in this step is the write-once process and therefore executed, as a matter of course, only when, as shown in FIG. 17, the MO is stored with the medium ID and when confirming that user data does not exist in the block in which the data is intended to be retained.

Given finally is an explanation of application of a function (hereinafter referred to as a three-dimensional authenticating function) of imparting the accumulation authenticator the data on the MO per group, which function is prepared as one function of the general medium process.

In CALS that has been increasingly used in recent years, a certain piece of I-data is expressed by structured data and management information thereof. If the structured data is simple, the data is constructed of a combination of the management information and the structured data. A date and an authenticator etc are added to this item of data by use of the data retaining apparatus in the embodiment, and the data may be transmitted. In general, however, the structured data contains a multiplicity of pieces of object information which are hierarchized in terms of the structure or security level. Further, a content of each piece of object information might be often updated on a different computer by a different person. Therefore, it is desired that a management corresponding to the security level be implement for each piece of object information.

The three-dimensional authenticating function is prepared for enabling such a management to be done. Herein, the three-dimensional authenticating function will be discussed by making an exemplification when in a data transmitting process.

Figure 18:
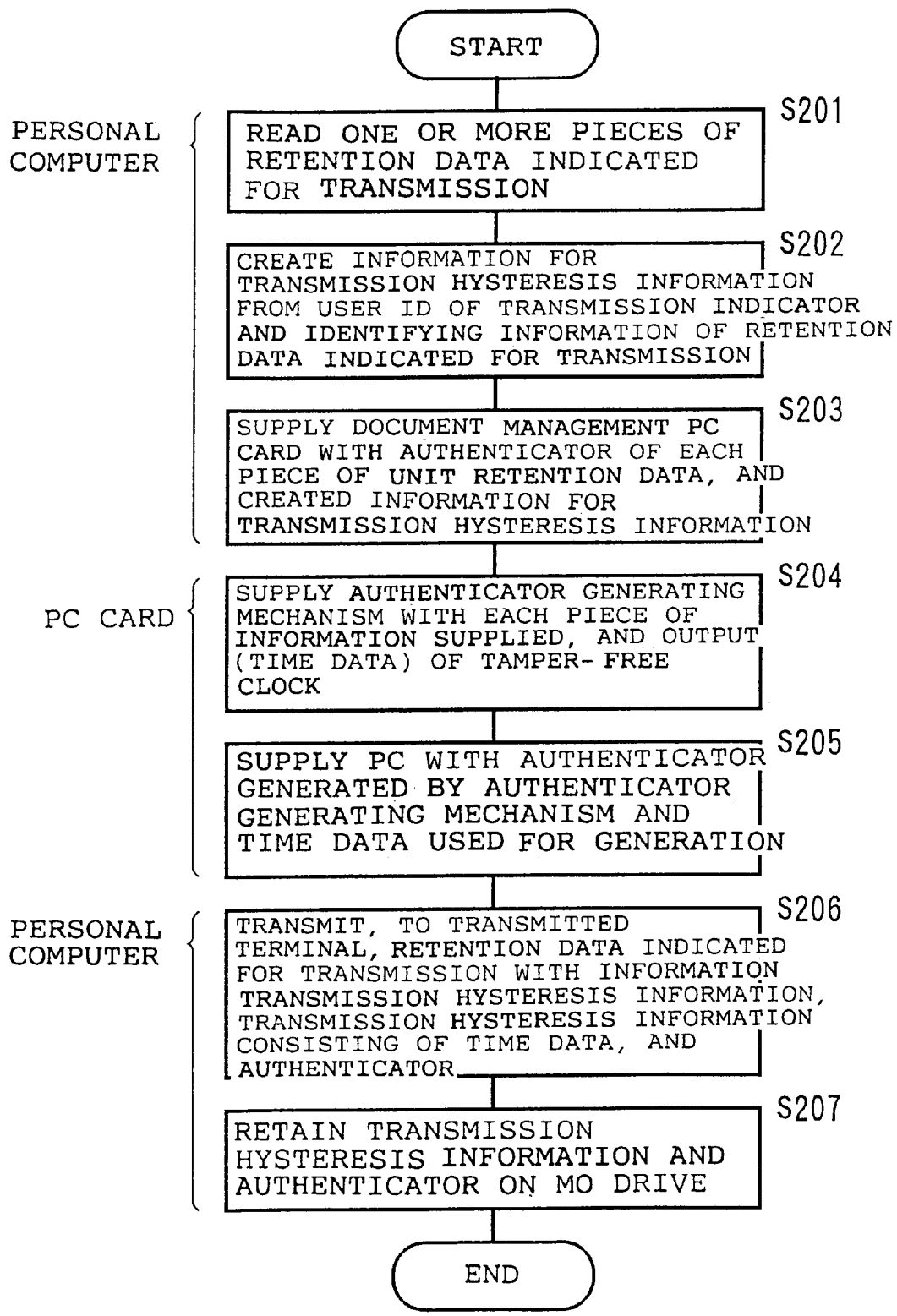
FIG. 18 is an explanatory flowchart showing a three-dimensional authenticating function incorporated into the data retaining apparatus in the embodiment.

The user, when effecting the data transmission using the three-dimensional authenticating function, inputs to the present apparatus a piece of information for specifying a transmitted terminal and some pieces of identifying information of the data to be transmitted to the transmitted terminal. A data management device (a personal computer 12) receiving an input such information, as shown in FIG. 18, at first reads from the MO one or more pieces of retention data(ranging from the data to the data of the authenticator indicated for transmission (step S201). Subsequently, the PC 12 recognizes a user ID etc of the user who indicated the transmission, and creates an item of information for transmission hysteresis information by combining the user ID with identifying information of the retention data indicated to be transmitted, transmitting terminal identifying information and transmitted terminal identifying information etc (step S202). Subsequently, the PC 12 supplied the document management PC card 13 with the authenticator of each piece of read-out retention data and the thus created information for the transmission hysteresis information (step S203).

The document management PC card 13 supplies an authenticator generating unit 22 with the authenticators and the information for the transmission hysteresis information that are supplied from the PC 12, and an output (time data) of the tamper-free clock 21 at that time (step S204). Then, the document management PC card 13 makes the authenticator generating unit 22 generate the authenticator based on those pieces of input information, and supplies the PC 12 with the time data when supplied to the authenticator generating unit 22, and the authenticators generated by the authenticator generating unit 22 (step S205).

The PC 12 receiving the supply of the time data and the authenticators transmits, to the transmitting terminal, the retention data indicated for transmission together with transmission hysteresis information consisting of the information for the transmission hysteresis information and the time data added thereto, and the authenticator as well (step S206). Then, after confirming that the transmission is normally completed, the transmission hysteresis information and the authenticator are retained in the MO drive 11 (step S207), and the processing comes to an end.

Figure 19:
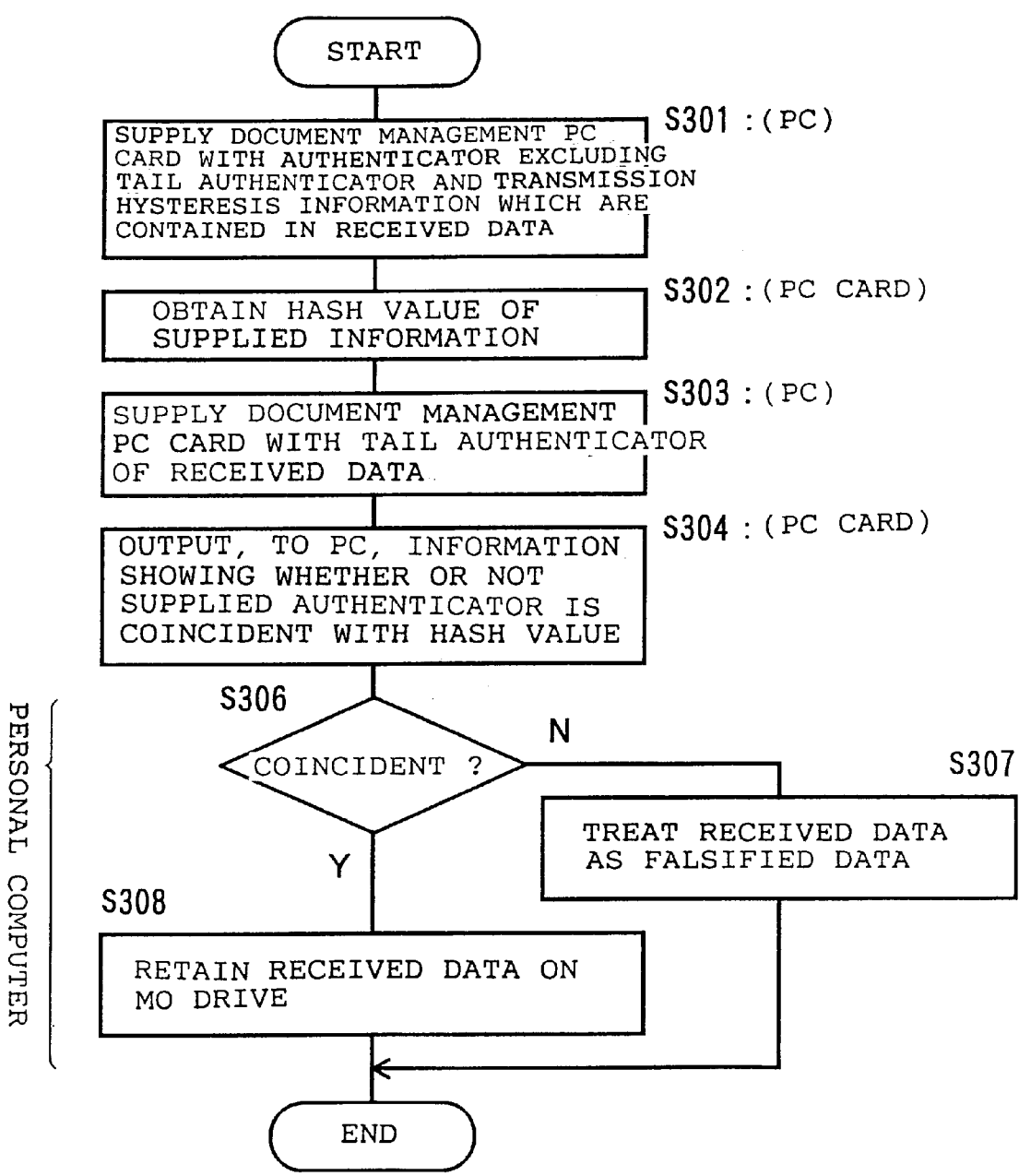
FIG. 19 is an explanatory flowchart showing the three-dimensional authenticating function incorporated into the data retaining apparatus in the embodiment.

On the other hand, in the data retaining apparatus that receives the data transmitted in step S206 and existing in the transmitted terminal, the concerned data are processed in procedures shown in FIG. 19.

To begin with, the PC 12 constituting the receiving-side data retaining apparatus supplies the document management PC card 13 with the authenticator excluding the tail authenticator and the transmission hysteresis information that are contained in the received data (step S301). The document management PC card 13 obtains a hash value of the information supplied (step S302). Thereafter, the PC 12 supplies the document management PC card 13 with the authenticator contained in the tail of the data received (step S303). The document management PC card 13 compares this authenticator with the hash value, and outputs to the PC 12 an item of information indicating whether or not the authenticator and the hash value are coincident with each other (step 5304).

The PC, when information showing that these two values are not coincident is inputted (step S306; N), treats the received data as falsified data (step S307). More specifically, the PC 12 notifies the user of the fact that the falsified data were received, and operates in accordance with a content of indication by the user. While on the other hand, when information showing that those two values are coincident is inputted (step S306; Y), the PC 12 retains the received data in the MO drive 11 (step S308), and the processing is finished.

Note that if the three-dimensional authenticating function not concomitant with the data transmission is started up, the PC 12 creates an item of information (hereinafter termed information for grouping hysteresis information) corresponding to the information for the transmission hysteresis information containing no transmitting terminal/transmitted terminal identifying information on the basis of the identifying information of plural pieces of retention data inputted by the user in step corresponding to step S202. Then, in steps corresponding to steps S203–S205, the PC 12 or the document management PC card 13 executes a process using the information for the grouping hysteresis information instead of using the information for the transmission hysteresis information. Thereafter, the PC 12 stores the MO with the grouping hysteresis information defined as information obtained by adding the time data (the output of the tamper-free clock 21) to the information for the grouping hysteresis information, and with the authenticator generated by the document management PC card 13.

Figure 20:
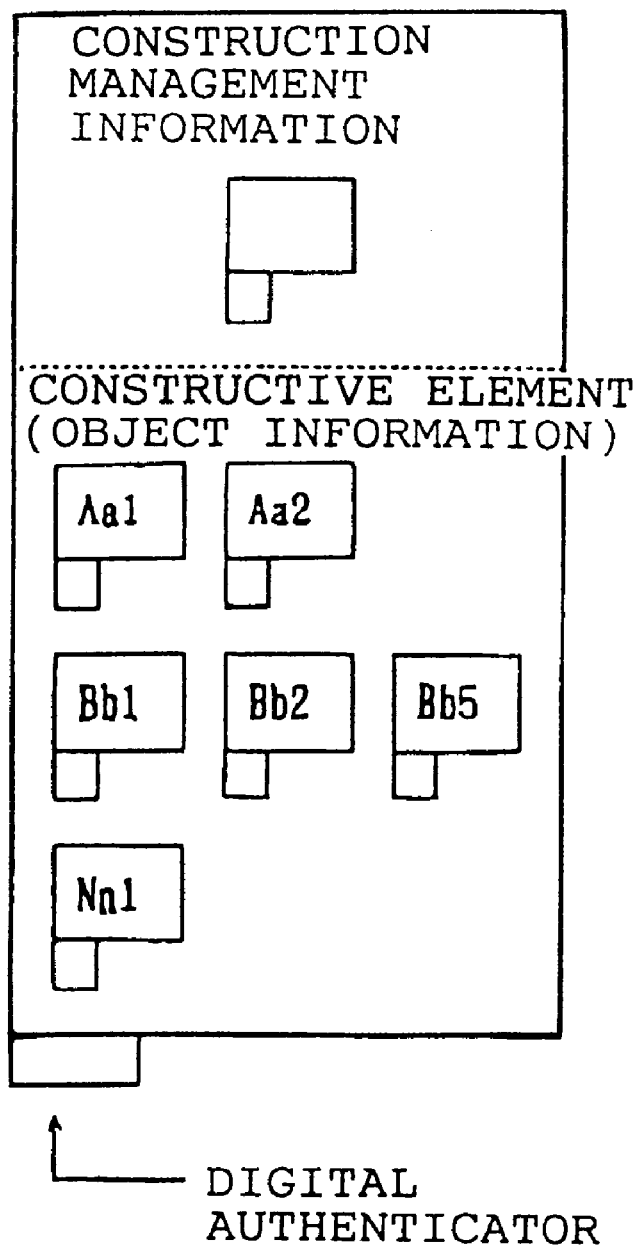
FIG. 20 is a diagram showing one applied example of the three-dimensional authenticating function incorporated into the data retaining apparatus in the embodiment.

Namely, if this three-dimensional authenticating function, as schematically shown in FIG. 20, the authenticators are imparted individually to each piece of object information and the management information thereof, and thereafter the authenticators (the accumulation authenticators) can be imparted to the whole. Hence, it is feasible to simply detect the falsifying manipulations against those pieces of information or a virus contamination. Incidentally, any kinds of objects to which the authenticators are imparted by the three-dimensional authenticating function, are acceptable. For example, however, as schematically shown in FIG. 21, it follows that the authenticity of the information can be more easily warranted than in the prior art by imparting the authenticators to a change element (difference information of a changed constructive element) and change hysteresis management information of the information kept on being revised, by use of the above three-dimensional authenticating function.

Figure 22:
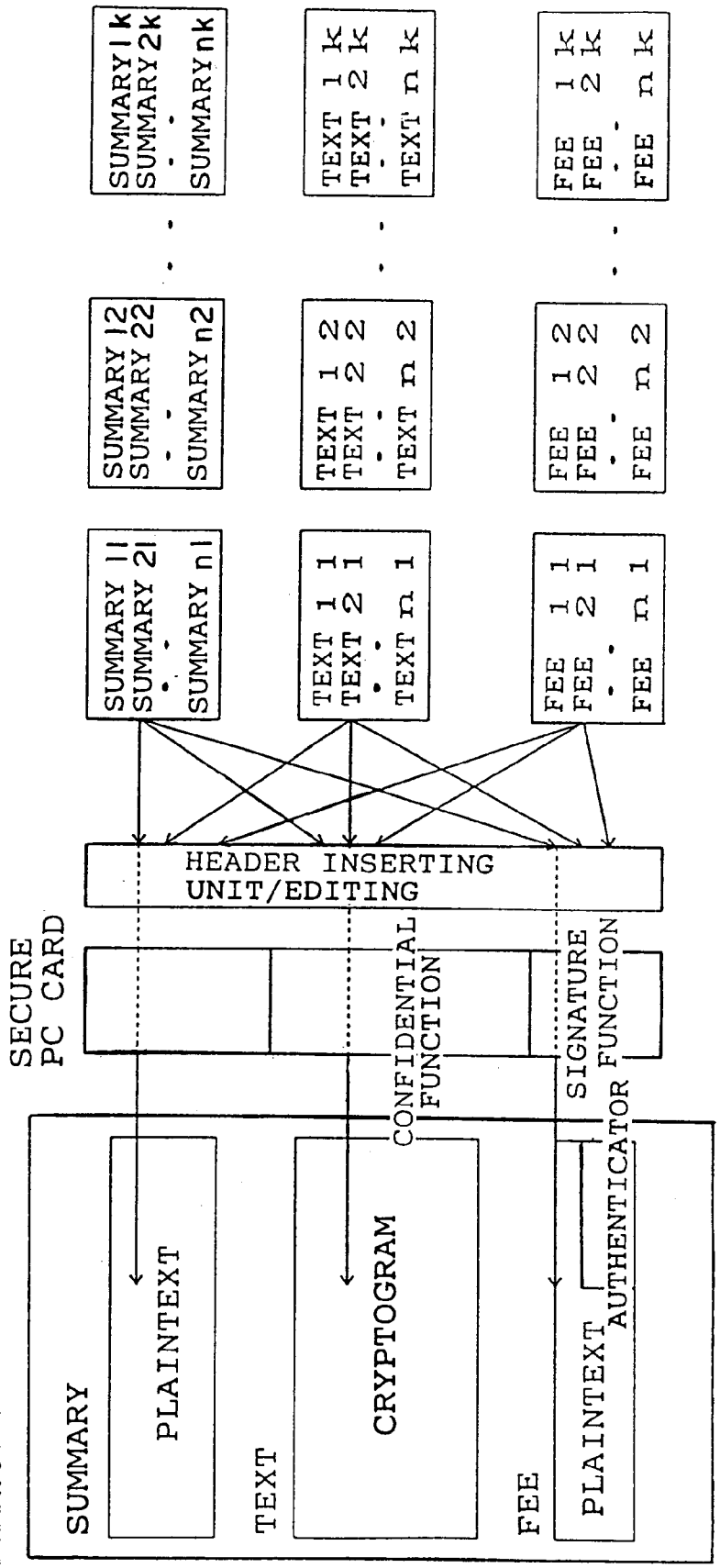
FIG. 22 is an explanatory diagram of a document confidentiality/signature processing concept on a high-order layer.

Note that the data retaining apparatus in the embodiment is the apparatus for imparting the authenticators to all the data, however, as a matter of course, an apparatus for imparting the authenticators to only the data designated by the user may be constructed. Further, it should be taken for granted that a text, the content of which should not be read, may be transferred to the network after converting this a cryptogram as schematically shown in FIG. 22 by use of a secure PC card obtained by providing the document management PC card 13 with a function of encrypting the data, and a summary the content of which may be read and a fee may be transferred as a plaintext to the network but in such a form as to impart the authenticators to the areas where it is desirable that the falsification of the data be verified.

It is apparent that, in this invention, a wide range of different working modes can be formed based on the invention without deviating from the spirit and scope of the invention. This invention is not restricted by its specific working modes except being limited by the appended claims.

FIG. 1: A . . . HASH FUNCTION, 1 . . . MEDIUM ID, 2 . . . RETENTION DATA, 3 . . . CLOCK, 4 . . . DATE DATA, 5 . . . COPY HYSTERESIS, 6 . . . DIGITAL SIGNATURE

FIG. 2: A . . . DIGITAL SIGNATURE, B . . . COPY HYSTERESIS, C . . . DATE DATA, D . . . RETENTION DATA. E . . . MEDIUM ID, 1 . . . O DATE, X MONTH, O YEAR, CREATE ORIGINAL DATA ON MEDIUM IDk, 2 . . . X DATE, O MONTH, X YEAR, COPY DATA ON MEDIUM IDk INTO MEDIUM IDj

FIG. 3(a): A . . . INPUT BLOCK DATA, B . . . KEY, C . . . TRUNCATE

FIG. 3(b): A . . . TIME, B . . . INPUT BLOCK DATA, C . . . Dn (FINAL BLOCK INPUT DATA), D . . . TRUNCATE

FIG. 4: A . . . HASH FUNCTION, B . . . COMPARATOR, 1 . . . MEDIUM ID, 2 . . . RETENTION DATA, 4 . . . DATE DATA, 5 . . . COPY HYSTERESIS, 6 . . . DIGITAL SIGNATURE

FIG. 5: 21 . . . TAMPER-FREE CLOCK. 12 . . . PERSONAL COMPUTER, A . . . SIGNATURE KEY, 23 . . . AUTHENTICATOR STORAGE MEMORY, 24 . . . ACCUMULATION MAC (MAC tot)

FIG. 6: A . . . OUTPUT ACCUMULATION Authenticator (MACtot), B . . . INPUT AUTHENTICATORS (MAC1–MACn) ON TRANSACTION UNIT, C . . . DATA STROBE CIRCUIT, D . . . MAC COUNTER, E . . . INPUT SWITCHING CONTROL, F . . . OUTPUT SWITCHING CONTROL, G . . . COMPARATOR, H . . . START, I . . . ADDRESS COUNTER, J . . . SET VALUE, K . . . GATE CIRCUIT, L . . . AUTHENTICATOR MEMORY, M . . . INPUT DATA, N . . . SELECTOR 2, O . . . KEYED HASHING FUNCTION PROCESS, O . . . SELECTOR 1

FIG. 7: (1) . . . STROBE SIGNAL OUTPUT, (2) . . . MAC DATA, (3) COUNTER START PULSE, (4) . . . COUNTER STOP PULSE, (5) . . . MACtot OUTPUT

FIG. 8: A . . . DIGITAL SIGNATURE

FIG. 9: A . . . VERIFYING KEY, B . . . COMPARATOR, C . . . DISPLAY UNIT

FIG. 10(a): A . . . MEDIUM ID, NUMBER OF VERSIONS, DATA, TITLE & DATE, AUTHENTICATOR, B . . . GENERATE DATE/AUTHENTICATOR FROM ID, NUMBER OF VERSIONS AND DATA, C . . . WRITE-ONCE/SIGNATURE VERIFYING MODULE, D . . . MEDIUM STORAGE REMAINING QUANTITY JUDGING DEVICE

FIG. 10(b): A . . . OUTPUT OF DATE, OUTPUT OF AUTHENTICATOR, C . . . CLOCK, D . . . INPUT OF ID, NUMBER OF VERSIONS, DATA AND AUTHENTICATOR, E . . . HASH FUNCTION, F . . . EXTRACTION OF AUTHENTICATOR, G . . . INCREMENT BY +1, H . . . OUTPUT OF NUMBER OF VERSIONS, I . . . VALUE OF NUMBER OF VERSIONS, J . . . COMPARATOR, K . . . EXTRACTION OF NUMBER OF VERSIONS, L . . . ACCUMULATION AUTHENTICATOR PROCESS, M . . . MODULE FUNCTION CONTROL TERMINAL

FIG. 11(a): A . . . MEDIUM ID, NUMBER OF VERSIONS, DATA, TITLE & DATE, AUTHENTICATOR, NUMBER OF VERSIONS, B . . . ISSUE NUMBER OF VERSIONS, C . . . WRITE-ONCE/SIGNATURE VERIFYING MODULE, D . . . MEDIUM STORAGE REMAINING QUANTITY JUDGING DEVICE

FIG. 11(b): A . . . CLOCK, B . . . INCREMENT BY +1, C . . . HASH FUNCTION, D . . . EXTRACTION OF AUTHENTICATOR, E . . . COMPARATOR, F . . . VALUE OF NUMBER OF VERSIONS, G . . . OUTPUT OF NUMBER OF VERSIONS, H . . . ACCUMULATION AUTHENTICATOR PROCESS, J . . . MODULE FUNCTION CONTROL TERMINAL

FIG. 12(a): A . . . MEDIUM ID, NUMBER OF VERSIONS, DATA, TITLE & DATE, AUTHENTICATOR, ACCUMULATION HYSTERESIS INFORMATION OF RETAINING MEDIUM 1003, ACCUMULATION AUTHENTICATOR, END, B . . . WRITE-ONCE/SIGNATURE VERIFYING MODULE, C . . . MEDIUM STORAGE REMAINING QUANTITY JUDGING DEVICE, D . . . WORK MEDIUM ACCUMULATION HYSTERESIS INFORMATION, E . . . ACCUMULATION AUTHENTICATOR PROCESS OUTPUT, F . . . WRITING OF END CODE

FIG. 12(b): A . . . CLOCK, B . . . INCREMENT BY +1, C . . . HASH FUNCTION, C . . . EXTRACTION OF AUTHENTICATOR, E . . . COMPARATOR, F . . . OUTPUT OF NUMBER OF VERSIONS, G . . . VALUE OF NUMBER OF VERSIONS, H . . . ACCUMULATION AUTHENTICATOR PROCESS, I . . . EXTRACTION OF NUMBER OF VERSIONS, J . . . MODULE FUNCTION CONTROL TERMINAL

FIG. 13(a): A . . . [EXAMPLE OF FORMAT ON FIRST VERSION MEDIUM 2125], B . . . MEDIUM ID, NUMBER OF VERSIONS, DATA, TITLE & DATE, AUTHENTICATOR, NUMBER OF VERSIONS, DATA, TITLE & DATE, AUTHENTICATOR, ACCUMULATION HYSTERESIS, ACCUMULATION AUTHENTICATOR, END, C . . . SERIAL NUMBER, MEDIUM ID, TITLE & CREATION DATE, CREATOR, NUMBER OF VERSIONS, AUTHENTICATOR, TITLE & CREATION DATE, CREATOR, NUMBER OF VERSIONS, AUTHENTICATOR, D . . . HYSTERESIS INFORMATION OF MEDIUM ID2125

FIG. 13(b): A . . . [EXAMPLE OF FORMAT ON SECOND VERSION MEDIUM 1003], B . . . MEDIUM ID, NUMBER OF VERSIONS, DATA, TITLE & DATE, AUTHENTICATOR, NUMBER OF VERSIONS, DATA, TITLE & DATE, AUTHENTICATOR, ACCUMULATION HYSTERESIS, ACCUMULATION AUTHENTICATOR, END, C . . . HYSTERESIS INFORMATION OF ID2125, SERIAL NUMBER, MEDIUM ID, TITLE & CREATION DATE, CREATOR, NUMBER OF VERSIONS, AUTHENTICATOR, TITLE & CREATION DATE, AUTHENTICATOR, D . . . HYSTERESIS INFORMATION OF MEDIUM ID1003

FIG. 13(c): A . . . [EXAMPLE OF FORMAT ON THIRD VERSION MEDIUM 2108], B . . . MEDIUM ID, NUMBER OF VERSIONS, DATA, TITLE & DATE, AUTHENTICATOR, BLANK (DATA UNCREATED), ACCUMULATION HYSTERESIS, ACCUMULATION AUTHENTICATOR, C . . . HYSTERESIS INFORMATION OF ID1003, SERIAL NUMBER, MEDIUM ID, TITLE & CREATION DATE, CREATOR, NUMBER OF

VERSIONS, AUTHENTICATOR, D . . . HYSTERESIS INFORMATION OF MEDIUM ID2108

FIG. 14: A . . . AUTHENTICATOR OF EACH ROW IS HASH VALUE OF EACH ROW LOG, B . . . INFORMATION ALREADY RECORDED AS LOG INFORMATION OF MEDIUM ID NO.2125, C . . . INFORMATION ALREADY RECORDED AS LOG INFORMATION OF MEDIUM ID NO.1003 (RETAINING MEDIUM RECORDED WITH HYSTERESIS INFORMATION OF PREVIOUS GENERATION AND PRESENT HYSTERESIS INFORMATION), D . . . INFOR MATION IMMEDIATELY RECORDED ON MEDIUM ID NO.2108 AS LOG INFORMATION THEREOF, G . . . NOTIFICATION OF DEFICIENCY OF MEDIUM CAPACITY, H . . . 2125 LACKS IN CAPACITY, AND RETAIN DATA ON NEW MEDIUM, I . . . ACCUMULATION AUTHENTICATOR OF MEDIUM ID2125, J . . . NOTIFICATION OF DEFICIENCY OF MEDIUM CAPACITY, K . . . 1003 LACKS IN CAPACITY, AND RETAIN DATA ON NEW MEDIUM, L . . . ACCUMULATION AUTHENTICATOR OF MEDIUM ID1003, M . . . (LATEST ACCUMULATION AUTHENTICATOR)

FIG. 15(a): A . . . MEDIUM ID, NUMBER OF VERSIONS, DATA, DATE, AUTHENTICATOR, NUMBER OF VERSIONS, B . . . DATA READING PROCESS IS THE SAME THEREAFTER, C . . . WRITE-ONCE/SIGNATURE/VERIFYING MODULE, D . . . OUTPUT OF WHETHER OR NOT DATA IS FALSIFIED

FIG. 15(b): A . . . CLOCK, B . . . INCREMENT +1, C . . . HASH FUNCTION, D . . . EXTRACTION OF AUTHENTICATOR, E . . . COMPARATOR, F . . . VALUE OF NUMBER OF VERSIONS, G . . . EXTRACTION OF NUMBER OF VERSIONS, H . . . ACCUMULATION AUTHENTICATOR PROCESS, I . . . OUTPUT OF WHETHER OR NOT DATA IS FALSIFIED

FIG. 16: S101 . . . IS SET MEDIUM RETENTION-PURPOSED ?, S102 . . . GENERAL MEDIUM PROCESS, S103 . . . IS SET MEDIUM NEW ONE ?, S104 . . . STORE WORK MEDIUM WITH ACCUMULATION HYSTERESIS INFORMATION OF RETAINING MEDIUM OF ONE GENERATION BEFORE, S105 . . . IS ACCUMULATION AUTHENTICATOR OF MEDIUM OBTAINED FROM WORK MEDIUM ?, S106 . . . REWRITE ACCUMULATION HYSTERESIS INFORMATION OF ONE GENERATION BEFORE TO WORK MEDIUM, S107 . . . IS RETENTION AREA SECURED ?, S108 . . . DISPLAY NOTIFICATION OF CAPACITY DEFICIENCY, S109 . . . RETAIN ACCUMULATION HYSTERESIS INFORMATION, S110 . . . RETAIN DATA

FIG. 17: A . . . DOES MEDIUM ID EXIST ?, B . . . DOES USER DATA EXIST IN BLOCK ?, C . . . IS NUMBER OF VERSIONS OF THAT BLOCK CONTINUAL TO NUMBER OF VERSIONS OF NEXT BLOCK ?, D . . . IS AUTHENTICATOR OF THAT BLOCK IDENTICAL WITH DECRYPTED AUTHENTICATOR ?, E . . . INHIBIT DATA WRITE TO THAT BLOCK, F . . . DOES END CODE EXIST IN NEXT BLOCK ?, G . . . INHIBIT CONTINUOUS USE OF THAT MEDIUM, H . . . PERMIT WRITE TO THAT BLOCK, I . . . IS THERE WRITE REQUEST TO NEXT BLOCK ?

FIG. 18: A . . . PERSONAL COMPUTER, B . . . PC CARD, C . . . PERSONAL COMPUTER, D . . . START, E . . . END, S201 . . . READ ONE OR MORE PIECES OF RETENTION DATA INDICATED FOR TRANSMISSION, S202 . . . CREATE INFORMATION FOR TRANSMISSION HYSTERESIS INFORMATION FROM USER ID OF TRANSMISSION INDICATOR AND IDENTIFYING INFORMATION OF RETENTION DATA INDICATED FOR TRANSMISSION, S203 . . . SUPPLY DOCUMENT MANAGEMENT PC CARD WITH AUTHENTICATOR OF EACH PIECE OF UNIT RETENTION DATA, AND CREATED INFORMATION FOR TRANSMISSION HYSTERESIS INFORMATION, S204 . . . SUPPLY AUTHENTICATOR GENERATING MECHANISM WITH EACH PIECE OF INFORMATION SUPPLIED, AND OUTPUT (TIME DATA) OF TAMPER-FREE CLOCK, S205 . . . SUPPLY PC WITH AUTHENTICATOR GENERATED BY AUTHENTICATOR GENERATING MECHANISM AND TIME DATA USED FOR GENERATION, S206 . . . TRANSMIT, TO TRANSMITTED TERMINAL, RETENTION DATA INDICATED FOR TRANSMISSION WITH INFORMATION TRANSMISSION HYSTERESIS INFORMATION, TRANSMISSION HYSTERESIS INFORMATION CONSISTING OF TIME DATA, AND AUTHENTICATOR, S207 . . . RETAIN TRANSMISSION HYSTERESIS INFORMATION AND AUTHENTICATOR ON MO DRIVE

FIG. 19: A . . . START, B . . . PERSONAL COMPUTER, C . . . END, S301:(PC) . . . SUPPLY DOCUMENT MANAGEMENT PC CARD WITH AUTHENTICATOR EXCLUDING TAIL AUTHENTICATOR AND TRANSMISSION HYSTERESIS INFORMATION WHICH ARE CONTAINED IN RECEIVED DATA, S302: (PC CARD), . . . OBTAIN HASH VALUE OF SUPPLIED INFORMATION, S303: (PC) . . . SUPPLY DOCUMENT MANAGEMENT PC CARD WITH TAIL AUTHENTICATOR OF RECEIVED DATA, S304: (PC CARD) . . . OUTPUT, TO PC, INFORMATION SHOWING WHETHER OR NOT SUPPLIED AUTHENTICATOR IS COINCIDENT WITH HASH VALUE, S306 . . . COINCIDENT ?, S307 . . . TREAT RECEIVED DATA AS FALSIFIED DATA, S308 . . . RETAIN RECEIVED DATA ON MO DRIVE

FIG. 20: A . . . CONSTRUCTION MANAGEMENT INFORMATION, B . . . CONSTRUCTIVE ELEMENT (OBJECT INFORMATION), C . . . DIGITAL AUTHENTICATOR

FIG. 21(a): A . . . V: NUMBER-OF-VERSIONS LEVEL (TIME: t), B . . . V 01 VERSION-V 0n VERSION, C . . . DIGITAL AUTHENTICATOR, D . . . SECURITY LEVEL

FIG. 21(b): NUMBER-OF-VERSIONS MANAGEMENT INFORMATION, V 02 VERSION-V 04 VERSION, B . . . CHANGE ELEMENT (OBJECT INFORMATION), C . . . DIGITAL AUTHENTICATOR

FIG. 22: A . . . DOCUMENT (DISPLAYED AS IT IS) TRANSFERRED TO NETWORK, B . . . SUMMARY, C . . . PLAINTEXT, D . . . TEXT, E . . . CRYPTOGRAM, . . . FEE, G . . . PLAINTEXT, H . . . AUTHENTICATOR, I . . . SECURE PC CARD, J . . . CONFIDENTIAL FUNCTION, K . . . SIGNATURE FUNCTION, L . . . HEADER INSERTING UNIT/EDITING, (L1) . . . SUMMARY, TEXT, FEE, (L2) . . . SUMMARY, TEXT, FEE, (Lk) . . . SUMMARY, TEXT, FEE

FIG. 23: 4 . . . CLOCK, 7 . . . HASH FUNCTION, A . . . LOG CREATION APPLICATION

Figure 24:
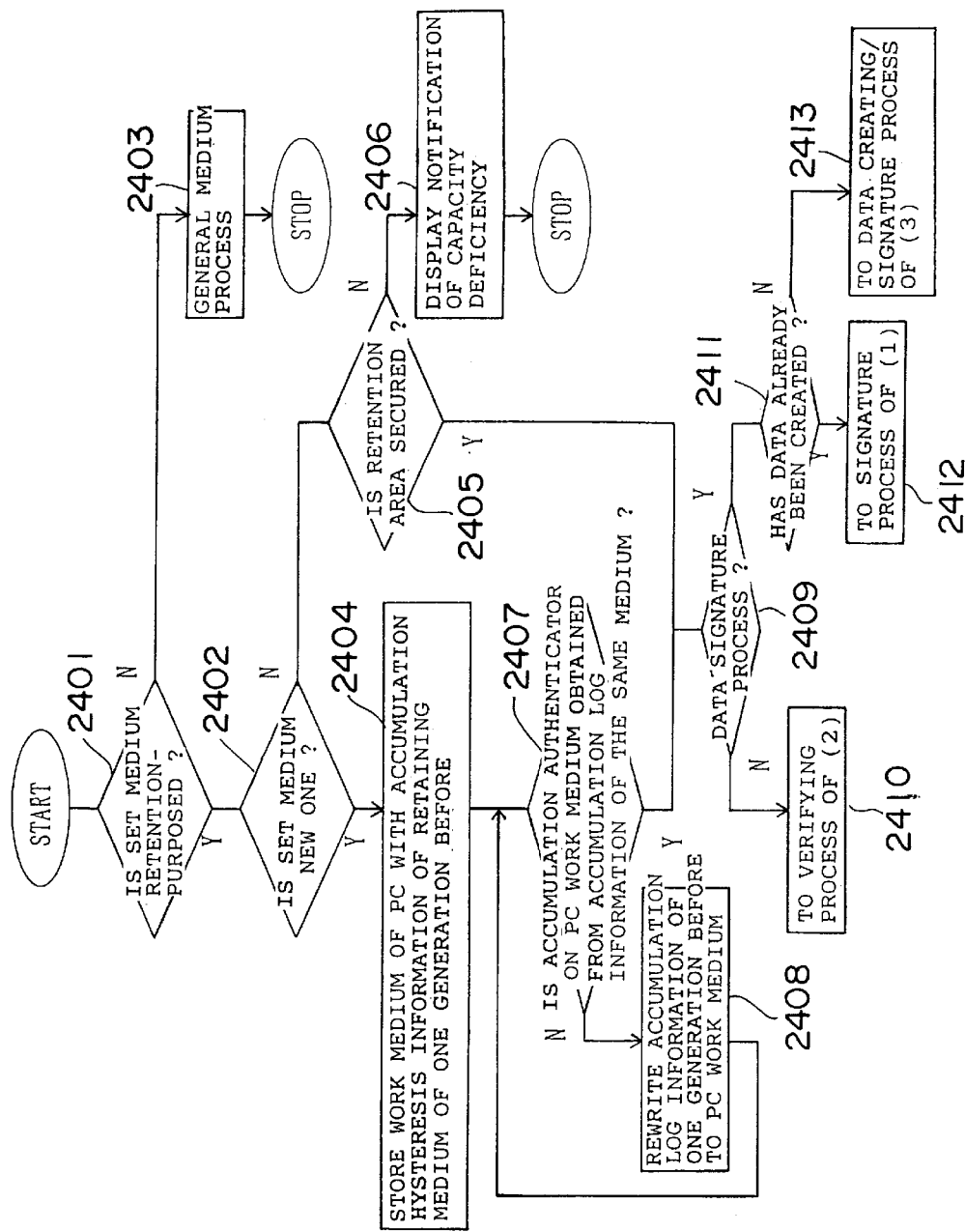
FIG. 24 is a flowchart showing a management between a plurality of mediums by using accumulation hysteresis information and accumulation authenticators.

FIG. 24: 2401 . . . IS SET MEDIUM RETENTION-PURPOSED ?, 2402 . . . IS SET MEDIUM NEW ONE ?, 2403 . . . GENERAL MEDIUM PROCESS, 2404 . . . STORE WORK MEDIUM OF PC WITH ACCUMULATION HYSTERESIS INFORMATION OF RETAINING

MEDIUM OF ONE GENERATION BEFORE, 2405 . . . IS RETENTION AREA SECURED 2406 . . . DISPLAY NOTIFICATION OF CAPACITY DEFICIENCY, 2407 . . . IS ACCUMULATION AUTHENTICATOR ON PC WORK MEDIUM OBTAINED FROM ACCUMULATION LOG INFORMATION OF THE SAME MEDIUM ?, 2408 . . . REWRITE ACCUMULATION LOG INFORMATION OF ONE GENERATION BEFORE TO PC WORK MEDIUM, 2409 . . . DATA SIGNATURE PROCESS ?, 2410 . . . TO VERIFYING PROCESS OF (2), 2411 . . . HAS DATA ALREADY BEEN CREATED ?, 2412 . . . TO SIGNATURE PROCESS OF (1), 2413 . . . TO DATA CREATING/SIGNATURE PROCESS OF (3)

FIG. 25: 2501 . . . READ MEDIUM IDENTIFICATION NUMBER MD1, RETENTION DATA, DATA, TIME DATA AND COPY HYSTERESIS LOG, 2502 . . . EXECUTE HASH FUNCTION PROCESS OF READ INFORMATION, 2503 . . . WRITE HASH FUNCTION PROCESSED VALUE (DIGITAL SIGNATURE VALUE) CS TO MEDIUM, NOTE) AS FOR FIGURE, REFER TO DATA RETAINING SYSTEM (SIGNATURE SYSTEM) OF MO BASE

FIG. 26: 2601 . . . READ MEDIUM IDENTIFICATION NUMBER MD1, RETENTION DATA, DATA, TIME DATA, COPY HYSTERESIS LOG, DIGITAL SIGNATURE VALUE CS, 2602 . . . EXECUTE HASH FUNCTION PROCESS OF READ INFORMATION, 2603 . . . COMPARE HASH FUNCTION PROCESSED VALUE (DIGITAL SIGNATURE VALUE) CS WITH RETAINING MEDIUM WRITTEN CS', 2604 . . . IS CS COINCIDENT WITH CS' ?, A . . . IF NO, GIVE NOTIFICATION OF FALSIFICATION, B . . . IF YES, GIVE NOTIFICATION THAT RECORD DATA IS NOT FALSIFIED

FIG. 27: 2701 . . . WRITE CREATED DATA TO PC WORK MEDIUM, 2702 . . . INDICATE WRITE OF CREATED DATA TO RETAINING MEDIUM, 2703 . . . MAKE TAMP-FREE CLOCK AUTOMATICALLY ISSUE TIME DATA AT THAT MOMENT, INSERT TIME DATA IN TAIL OF CREATED DATA AND INPUT IT TO HASH FUNCTION, 2704 . . . AUTOMATICALLY CREATE NAME OF DATA CREATOR, NUMBER OF CREATED VERSIONS, REFERENCE RETAINING MEDIUM ID AND RETAINED MEDIUM ID, INSERT THESE PIECES OF DATA IN TAIL OF TIME DATA AS COPY HYSTERESIS INFORMATION LOG, AND WRITE THEM TO RETAINING MEDIUM, 2705 . . . READ MEDIUM IDENTIFICATION NUMBER MD1, WORK MEDIUM DATA, TIME DATA AND COPY HYSTERESIS LOG, 2706 . . . EXECUTE HASH FUNCTION PROCESS OF READ INFORMATION, 2707 . . . WRITE HASH FUNCTION PROCESSED VALUE CS TO RETAINING MEDIUM

What is claimed is:

1. A method of retaining data on a recording medium, comprising:

recording, when registering a plurality of documents (n, n+1 . . . ) on the same recording medium, an n-th authenticator obtained by executing an encrypting process of data of the n-th document, together with the n-th document data; and generating, when registering data of the (n+1)-th document, an (n+1)-th authenticator by executing the encrypting process of the n-th authenticator and the (n+1)-th document data as the (n+1)-th authenticator.

2. A format structure of a recording medium, comprising:

a medium identification number area recorded with a numerical value determined when in a manufacturing process and characteristic of a medium;

a user data retention area stored with user data;

a time data area recorded with a date and a time when creating the user data;

an accumulation hysteresis information storage area recorded with registration hysteresis of a document within at least said medium; and an authenticator storage area registered with an authenticator obtained by executing an encrypting process of said medium identification number, the user data, the time data and the accumulation hysteresis information.

3. A recorded recording medium comprising:

a medium identification number composed of a numerical value determined when in a manufacturing process and characteristic of each medium;

an area for retaining user data;

time data defined as a date and a time when creating the user data;

a registration hysteresis for a document recorded within at least said medium; and an authenticator obtained by executing an encrypting process of said medium identification number, the user data, the time data and the accumulation hysteresis information.

4. A program storing medium stored with a program, comprising:

recording, when registering a plurality of documents (n, n+1 . . . ) on the same recording medium, an n-th authenticator obtained by executing an encrypting process of data of the n-th document, together with the n-th document data; and generating, when registering data of the (n+1)th document, an (n+1)-th authenticator by executing the encrypting process of the n-th authenticator and the (n+1)-th document data as the (n+1)th authenticator.

5. A format structure of a recording medium according to claim 2, wherein a registration hysteresis of a document recorded on another medium is also recorded together with the registration hysteresis of the document on said medium itself in said accumulation hysteresis information storage area, and the authenticator of a document registered first on said medium itself is generated based on the authenticator obtained from the registration hysteresis of said another medium.

6. A data retaining apparatus for retaining data on an attachable/detachable and rewritable recording medium, comprising:

time data outputting means, for outputting time data, incapable of adjusting the time data to be outputted;

authenticator creating means for creating, when receiving a request for writing an item of data, an authenticator of the item of data by obtaining a hash function processed value, with information containing the item of data and the time data outputted by said time data outputting means serving as an input; and writing means for writing, to said recording medium, the authenticator created by said authenticator creating means, and the item of data and the time data used for creating the authenticator.

7. A data retaining apparatus according to claim 6, wherein said recording medium is stored with characteristic medium identifying information, and wherein said authenticator creating means creates the authenticator of the item of data by obtaining the hash function processed value, with information containing the medium identifying information stored on said recording medium, and with the item of data and the time date serving as an input.

8. A data retaining apparatus according to claim 6, further comprising:

accumulation authenticator creating means for creating an accumulation authenticator defined as an authenticator relative to a data group composed of plural pieces of data by obtaining a hash function processed value, with information composed of authenticators relative to the plural pieces of data stored on said recording medium serving as an input; and accumulation authenticator writing means for writing the accumulation authenticator created by said accumulation authenticator creating means to said recording medium in such a form that a corresponding relationship with the data group is understandable.

9. A data retaining apparatus according to claim 7, wherein said writing means is a means for writing the data in only areas not used for storing the data on said recording medium, and wherein said data retaining apparatus further comprises:

creator information obtaining means for obtaining information on a creator of the data to be written to said recording medium;

storing means for storing the creator information obtained by said creator information obtaining means, together with the authenticator and the time data that are stored on said recording medium by said writing means;

first hysteresis information/accumulation authenticator writing means for writing, when predetermined conditions are met in the case of said recording medium being defined as a first version medium, to said recording medium, an accumulation authenticator defined as a hash function processed value with information containing authenticators relative to all the data stored on said recording medium serving as an input, and hysteresis information containing the information stored in said storing means and the medium identifying information of said recording medium; and second hysteresis information/accumulation authenticator writing means for obtaining, when the predetermined conditions are met in the case of said recording medium not being defined as the first version medium, hysteresis information and accumulation authenticators stored on a previous generation recording medium defined as a recording medium of one generation before said recording medium, obtaining an accumulation authenticator defined as a hash function processed value with information containing the authenticators relative to all the data stored on said recording medium and the accumulation authenticators stored on said previous generation recording medium serving as an input, and writing, to said recording medium, the obtained accumulation authenticators, and the hysteresis information containing the information stored on said storage means and the medium identifying information of said recording medium.

10. A data retaining method of retaining data on an attachable/detachable and rewritable recording medium, comprising:

an authenticator creating step of creating, when receiving a request for writing an item of data, an authenticator of the item of data by obtaining a hash function processed value with information containing the item of data and time data outputted by a tamper-free clock serving as input; and a writing step of writing, to said recording medium, the authenticator created in said authenticator creating step, and the item of data and the time data used for creating the authenticator.

11. A data retaining method according to claim 10, wherein said recording medium is stored with characteristic medium identifying information, and wherein said authenticator creating step is a step of creating the authenticator of the item of data by obtaining a hash function processed value with information containing the medium identifying information stored on said recording medium, the item of data and the time data serving as an input.

12. A data retaining method according to claim 10, further comprising:

an accumulation authenticator creating step of creating an accumulation authenticator defined as an authenticator relative to a data group composed of plural pieces of data by obtaining a hash function processed value, with information composed of authenticators relative to the plural pieces of data stored on said recording medium serving as an input; and an accumulation authenticator writing step of writing the accumulation authenticators created in said accumulation authenticator creating step to said recording medium in such a form that a corresponding relationship with the data group is understandable.

13. A data retaining method according to claim 10, wherein said writing step is a step of writing the data in only areas not used for storing the data on said recording medium, and wherein said method further comprises:

a creator information obtaining step of obtaining information on a creator of the item of data to be written to said recording medium;

a storing step of storing the creator information obtained in said creator information obtaining step, together with the authenticator and the time data that are stored on said recording medium in said writing step;

a first hysteresis information/accumulation authenticator writing step of writing, when predetermined conditions are met in the case of said recording medium being defined as a first version medium, to said recording medium, an accumulation authenticator defined as a hash function processed value with information containing authenticators relative to all the data stored on said recording medium serving as an input, and hysteresis information containing the information stored in said storing means and the medium identifying information of said recording medium; and a second hysteresis information/accumulation authenticator writing step of obtaining, when the predetermined conditions are met in the case of said recording medium not being defined as the first version medium, hysteresis information and accumulation authenticators stored on a previous generation recording medium defined as a recording medium of one generation before said recording medium, obtaining an accumulation authenticator defined as a hash function processed value with information containing the authenticators relative to all the data stored on said recording medium and the accumulation authenticators stored on said previous generation recording medium serving as an input, and writing, to said recording medium, the obtained accumulation authenticators, and the hysteresis information containing the information stored in said storing step and the medium identifying information of said recording medium.

14. A method of recording data on a plurality of recording mediums, comprising:

generating a first authenticator by executing an encrypting process of a record content recorded on a first recording medium, and registering the first authenticator on said first recording medium;

comparing an encrypted value of the record content on said first recording medium with a value obtained when reading the first authenticator; and generating, if a result of the comparison shows a coincidence therebetween, a second authenticator by executing the encrypting process of the first authenticator and a record content recorded on a second recording medium, and registering the second authenticator on said second recording medium.

15. A method of recording data on a plurality of recording mediums according to claim 14, wherein the second record content includes at least a record accumulation hysteresis of said first recording medium, and a record accumulation hysteresis of said second recording medium.

16. A method of verifying a validity of a record content, comprising:

comparing an encrypted value of a record content recorded on a second recording medium with an authenticator read from the second recording medium in claim 14; and judging whether or not record contents between the first recording medium and the second recording medium are falsified or alternatively disposed of.

17. A program storage medium stored with a program comprising:

generating a first authenticator by executing an encrypting process of a record content recorded on a first recording medium, and registering the first authenticator on said first recording medium;

comparing an encrypted value of the record content on said first recording medium with a value obtained when reading the first authenticator; and generating, if a result of the comparison shows a coincidence therebetween, a second authenticator by executing the encrypting process of the first authenticator and a record content recorded on a second recording medium, and registering the second authenticator on said second recording medium.

* * * * *